United States Patent
Mabuchi et al.

(10) Patent No.: US 8,462,526 B2
(45) Date of Patent: *Jun. 11, 2013

(54) DC/AC CHOPPER TYPE POWER CONVERTER FOR NON-INSULATED TYPE POWER CONDITIONER WITH GAIN CALIBRATION OF MEASURING CIRCUIT

(75) Inventors: Masao Mabuchi, Kyoto (JP); Kazuyoshi Imamura, Kyoto (JP); Mio Miyamoto, Kyoto (JP); Kohei Takahashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 317 days.

This patent is subject to a terminal disclaimer.

(21) Appl. No.: 13/034,056

(22) Filed: Feb. 24, 2011

(65) Prior Publication Data

US 2011/0235384 A1  Sep. 29, 2011

(30) Foreign Application Priority Data

Mar. 10, 2010 (JP) ................................. 2010-052761

(51) Int. Cl.
- H02M 7/00 (2006.01)
- H02M 7/5387 (2007.01)
- H02M 3/24 (2006.01)
- H02M 7/48 (2007.01)
- H02M 7/10 (2006.01)

(52) U.S. Cl.
USPC ................. 363/124; 363/65; 363/68; 363/71; 363/98; 363/132

(58) Field of Classification Search
USPC ................. 363/65, 68, 70, 71, 39, 40, 45, 46, 363/95, 97, 98, 131, 132, 124

See application file for complete search history.

(56) References Cited

U.S. PATENT DOCUMENTS 6,009,002 A * 12/1999 Steimer ............................ 363/34
7,692,938 B2 * 4/2010 Petter ............................. 323/361

(Continued)

FOREIGN PATENT DOCUMENTS

JP  11-187647 A  7/1999
JP  2000-116005 A  4/2000

(Continued)

OTHER PUBLICATIONS

Patent Abstracts of Japan for Japanese Publication No. 2000-116005, publication date Apr. 21, 2000 (1 page).

(Continued)

Primary Examiner — Bao Q Vu
Assistant Examiner — Zekre Tsehaye
(74) Attorney, Agent, or Firm — Osha Liang LLP

(57) ABSTRACT

A power converter enhances conversion efficiency from DC power to AC power. A first chopper circuit chops DC voltage from a photovoltaic panel at a system frequency producing a first square-wave whose voltage level changes positively. A second chopper circuit chops the first square-wave at a frequency double the system frequency producing a second square-wave whose voltage level changes negatively and adds the first square-wave and the second square-wave to produce a third square-wave that changes positively and negatively in a sine-wave manner. A third chopper circuit charges and discharges by chopping the third square-wave at a third frequency fixed by timing according to a difference between the third square-wave and a sine-wave voltage. PWM control is performed on the charge and discharge outputs such that the difference is corrected, producing a sine-wave voltage that continuously changes positively and negatively. A spike noise of an output voltage is suppressed.

7 Claims, 17 Drawing Sheets

U.S. PATENT DOCUMENTS

| | | | |
|---|---|---|---|
| 7,692,940 B2* | 4/2010 | Ochiai et al. | 363/98 |
| 8,009,443 B2* | 8/2011 | Krause | 363/17 |
| 2002/0118559 A1* | 8/2002 | Kurokami et al. | 363/131 |
| 2005/0030683 A1* | 2/2005 | Tailliet | 361/18 |
| 2008/0101101 A1* | 5/2008 | Iwata et al. | 363/71 |
| 2010/0020578 A1* | 1/2010 | Ryu et al. | 363/68 |
| 2011/0278935 A1* | 11/2011 | Gurunathan et al. | 307/77 |

FOREIGN PATENT DOCUMENTS

| | | |
|---|---|---|
| JP | 2002-010496 | 1/2002 |
| JP | 2007-221903 A | 8/2007 |

OTHER PUBLICATIONS

Patent Abstracts of Japan for Japanese Publication No. 11-187647, publication date Jul. 9, 1999 (1 page).

Patent Abstracts of Japan for Japanese Publication No. 2007-221903, publication date Aug. 30, 2007 (1 page).

Patent Abstract in Japanese Publication No. 2002-010496 Publication date Jan. 11, 2002 (1 page).

* cited by examiner

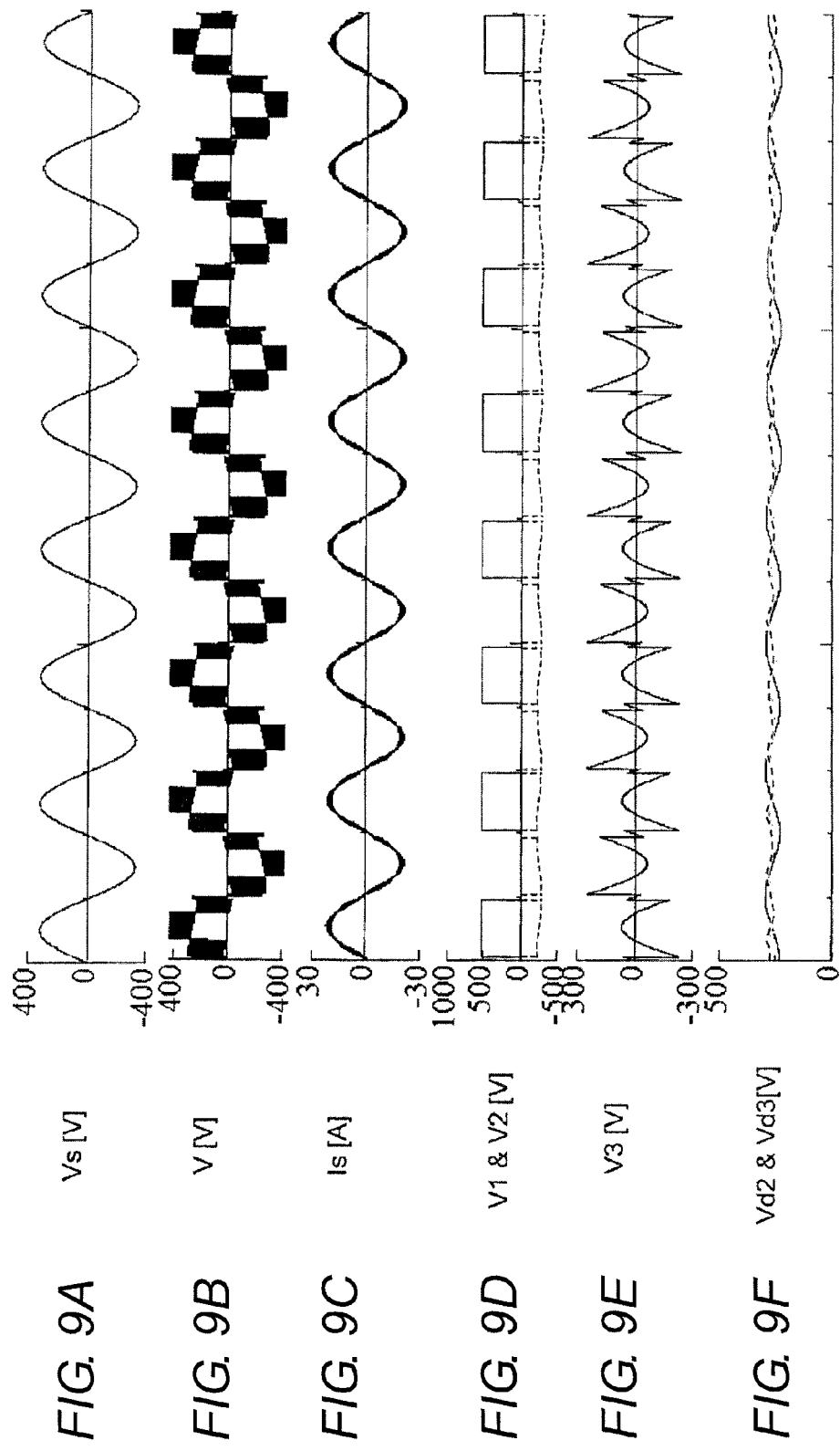

DC/AC CHOPPER TYPE POWER CONVERTER FOR NON-INSULATED TYPE POWER CONDITIONER WITH GAIN CALIBRATION OF MEASURING CIRCUIT

BACKGROUND OF THE INVENTION

1. Technical Field

One or more embodiments of the present invention relate to a chopper type power converter that chops a DC power to convert the DC power into an AC power and a power conditioner provided therewith.

One or more embodiments of the invention relate to a power converter that suitably converts the DC power generated by a DC power source such as a photovoltaic cell and a fuel cell into the AC power interconnected to a system and a power conditioner provided therewith.

2. Related Art

Recently, from the viewpoint of protection of a global environment, power generation systems, such as a photovoltaic cell and a fuel cell, which have a little influence on the environment are actively developed.

In some power generation systems, a power conditioner converts a DC power from a DC power source such as the photovoltaic cell that generates the power into an AC power having a commercial frequency interconnected to a system. The converted AC power is supplied to a household load connected to a commercial power system, and an excess power reversely flows onto the system side when the power generated by the power source exceeds power consumption of the household load.

Generally the power conditioner used in the power generation system includes an inverter that converts the DC power generated by the photovoltaic cell into the AC power and a protection device that is used to perform the interconnection to the system. The power conditioner is classified into an insulating type in which a DC portion and an AC portion are electrically insulated by an insulating transformer and a non-insulating type in which the insulating transformer is not used. When the insulating type and the non-insulating type are compared to each other, the non-insulating type is widely used because the non-insulating type is superior to the insulating type in power conversion efficiency (for example, see Japanese Unexamined Patent Publication No. 2002-10496).

FIG. 18 illustrates a configuration example of a photovoltaic power system provided with a non-insulating type power conditioner.

A power conditioner 36 is operated while interconnected to a commercial power source 2.

The power conditioner 36 includes a smoothing capacitor 33 that smoothes a power-generation output from a photovoltaic panel 1, a PWM-control inverter 34, a filter 35 that includes a reactor and a capacitor, and a control circuit (not illustrated).

In the power conditioner 36, the smoothing capacitor 33 smoothes the power-generation output from the photovoltaic panel 1. An inverter 34 includes four switch elements 37 to 40 each of which includes a MOSFET connected in reversely parallel to a diode. In the power conditioner 36, the power-generation output from the photovoltaic panel 1, smoothed by the smoothing capacitor 33, is converted into the AC power synchronized with a commercial power system to output the AC power by switching control in which the switch elements 37 to 40 of the inverter 34 are turned on and off at a frequency as high as about 18 KHz. The power conditioner 36 supplies the AC power to a load (not illustrated) through the filter 35 or reversely flows the AC power onto the system side.

In the PWM-control inverter 34 included in the power conditioner 36, it is necessary that the DC power having a high voltage of, for example, about 800 V from the photovoltaic panel 1 be converted into the AC power by performing the switching operations of the switch elements 37 to 40 at the frequency as high as about 18 KHz. Therefore, unfortunately the power converter provided with the conventional power conditioner 36 has low power conversion efficiency because a large switching loss is generated during power conversion of the power conditioner 36.

One or more embodiments provide a power converter that enhances the conversion efficiency from the DC power into the AC power and a power conditioner provided therewith.

SUMMARY OF THE INVENTION (1) In accordance with an aspect of one or more embodiments of the present invention, a power converter includes: first means for chopping a DC voltage at a first frequency to produce a first square-wave voltage string including a plurality of square-wave voltages, a voltage level of the square-wave voltage changing onto a positive side with respect to a first reference potential, the first means including a first switch circuit in which first and second switch elements are connected in series, the first switch circuit being connected in parallel to a first capacitor connected between positive and negative electrodes of a DC power source; second means for chopping an output of the first means at a second frequency higher than the first frequency to produce a second square-wave voltage string including a plurality of square-wave voltages, a voltage level of the square-wave voltage being lower than that of the first square-wave voltage string on the positive side and changing onto a negative side with respect to a second reference potential, a potential at the first square-wave voltage string being set to the second reference potential, the second means producing a third square-wave voltage string by adding the first square-wave voltage string and the second square-wave voltage string, the first square-wave voltage string and the second square-wave voltage string alternately changing in a sine-wave manner on positive and negative sides with respect to the first reference potential in the third square-wave voltage string, the second means including a parallel-connected circuit in which a second capacitor and a second switch circuit are connected in parallel, one side of the parallel-connected circuit being connected to a series-connected portion of the first and second switch elements, the second switch circuit including third and fourth switch elements connected in series; third means for chopping the third square-wave voltage string at a third frequency to perform charge and discharge, the third frequency being fixed by timing according to a positive or a negative of a difference between the third square-wave voltage string and a sine-wave voltage, the third means including a parallel-connected circuit in which a third capacitor and a third switch circuit are connected in parallel, the third switch circuit including fifth and sixth switch elements connected in series, a series-connected portion of the fifth and sixth switch elements being connected to a series-connected portion of the third and fourth switch elements; fourth means for performing PWM control to outputs of the charge and discharge of the third square-wave voltage string means at a PWM frequency higher than the third frequency so as to correct the difference between the third square-wave voltage string and the sine-wave voltage, the fourth means obtaining a sine-wave voltage that continuously changes on the positive and negative sides with respect to the first reference potential by the third square-wave voltage string and the PWM output, the fourth means including a fourth switch circuit that is connected in parallel to the parallel-connected circuit of the third means, the fourth switch circuit including seventh and eighth switch elements connected in series; a plurality of measuring circuits each of which measures a voltage between both ends of each of the first capacitor, the second capacitor, and the third capacitor; control means for controlling each of the first to eighth switch elements based on a measured value of each measuring circuit; and gain calibration means for calibrating a gain of each measuring circuit.

In the power converter in accordance with an aspect of one or more embodiments of the invention, the first means produces the first square-wave voltage string that changes onto the positive side of the first frequency. The second means produces the second square-wave voltage string that changes onto the negative side of the second frequency that is higher than the first frequency, and produces the third square-wave voltage string by adding the first square-wave voltage string and the second square-wave voltage string. The third square-wave voltage string alternately changes in the sine-wave manner on the positive and negative sides. The third performs the charge and discharge at the third frequency fixed by timing according to the positive or negative of the difference between the third square-wave voltage string and the sine-wave voltage.

Therefore, the first to third frequencies that are of the chopping frequencies of the first to third means can be set much lower than the switching frequency of the conventional PWM-control inverter that produces many square-wave voltage strings in a positive or negative half period of the sine wave.

As a result, the number of switching times can be decreased, and an element in which a conduction loss is reduced even if the switching loss is somewhat increased as the switch element can be selected.

The fourth means performs the PWM control to the voltage of the difference between the third square-wave voltage string and the sine-wave voltage, so that the switching can be performed at a voltage lower than that of the conventional PWM-control inverter. From this point, the switching loss can be reduced in the power converter of an aspect.

As described above, in the power converter of an aspect, the power conversion efficiency can be improved compared with the conventional inverter.

Each of the measuring circuits measures the voltage between both ends of each of the first to third capacitors of the first to third means, the control means performs ON/OFF control to each of the first to eighth switch elements based on the measured value of each measuring circuit, and the gain calibration means calibrates the gain of each measuring circuit that measures the voltage between both ends of each of the first to third capacitors. Therefore, there is no error such that the measured value varies with respect to the identical voltage due to a variation of components constituting the measuring circuits, which allows a spike noise caused by the error to be prevented from being generated in the output voltage at a moment when the control means switches the turn-on and turn-off of the first to eighth switch element.

(2) In the power converter in accordance with an aspect of one or more embodiments of the invention, the control means controls the first to eighth switch elements while short-circuiting an output of the fourth means such that an identical voltage is applied to both ends of two capacitors in the first capacitor, the second capacitor, and the third capacitor, and the gain calibration means calibrates the gain based on the measured values of the measuring circuits corresponding to the two capacitors to which the identical voltage is applied.

Accordingly, the control means performs the control such that the identical voltage is applied to the two capacitors, the gain calibration means can calibrate the gain of the measuring circuits corresponding to the two capacitors, and the gain can automatically be calibrated.

(3) In the power converter in accordance with an aspect of one or more embodiments of the invention, the control means sets one of the first capacitor, the second capacitor, and the third capacitor to a reference and performs control such that an identical voltage is applied to both ends of each two capacitors including the reference capacitor, and the gain calibration means calibrates the gains of the two measuring circuits except the reference capacitor based on the measured value of the measuring circuit corresponding to the reference capacitor to which the identical voltage is applied.

Accordingly, for example, the identical voltage is applied to both ends of each the first and second capacitors, the gain of the measuring circuit corresponding to the second capacitor can be calibrated based on the measured value of the measuring circuit corresponding to the first capacitor, the identical voltage is applied to both ends of each the first and third capacitors, and the gain of the measuring circuit corresponding to the third capacitor can be calibrated based on the measured value of the measuring circuit corresponding to the first capacitor.

(4) In accordance with an aspect of one or more embodiments of the present invention, a power conditioner that converts a DC power from a DC power source into an AC power interconnected to a system of a commercial power source, the power conditioner includes: first means for chopping a DC voltage at a first frequency that is a system frequency to produce a first square-wave voltage string including a plurality of square-wave voltages, a voltage level of the square-wave voltage changing onto a positive side with respect to a first reference potential, the first means including a first switch circuit in which first and second switch elements are connected in series, the first switch circuit being connected in parallel to a first capacitor connected between positive and negative electrodes of a DC power source; second means for chopping an output of the first means at a second frequency higher than the first frequency by a predetermined number of times to produce a second square-wave voltage string including a plurality of square-wave voltages, a voltage level of the square-wave voltage being lower than that of the first square-wave voltage string on the positive side and changing onto a negative side with respect to a second reference potential, a potential at the first square-wave voltage string being set to the second reference potential, the second means producing a third square-wave voltage string by adding the first square-wave voltage string and the second square-wave voltage string, the first square-wave voltage string and the second square-wave voltage string alternately changing in a sine-wave manner on positive and negative sides with respect to the first reference potential in the third square-wave voltage string, the second means including a parallel-connected circuit in which a second capacitor and a second switch circuit are connected in parallel, one side of the parallel-connected circuit being connected to a series-connected portion of the first and second switch elements, the second switch circuit including third and fourth switch elements connected in series; third means for chopping the third square-wave voltage string at a third frequency to perform charge and discharge, the third frequency being fixed by timing according to a positive or a negative of a difference between the third square-wave voltage string and a sine-wave voltage, the third means including a parallel-connected circuit in which a third capacitor and a third switch circuit are connected in parallel, the third switch circuit including fifth and sixth switch elements connected in series, a series-connected portion of the fifth and sixth switch elements being connected to a series-connected portion of the third and fourth switch elements; fourth means for performing PWM control to outputs of the charge and discharge of the third square-wave voltage string means at a PWM frequency higher than the third frequency so as to correct the difference between the third square-wave voltage string and the sine-wave voltage, the fourth means obtaining a sine-wave voltage that continuously changes on the positive and negative sides with respect to the first reference potential by the third square-wave voltage string and the PWM output, the fourth means including a fourth switch circuit that is connected in parallel to the parallel-connected circuit of the third means, the fourth switch circuit including seventh and eighth switch elements connected in series; a plurality of measuring circuits each of which measures a voltage between both ends of each of the first capacitor, the second capacitor, and the third capacitor; control means for controlling each of the first to eighth switch elements based on a measured value of each measuring circuit; and gain calibration means for calibrating a gain of each measuring circuit.

In the power conditioner in accordance with an aspect of one or more embodiments of the invention, the first to third means produces the third square-wave voltage string that alternately changes in the sine-wave manner on the positive and negative sides, and the charge and discharge are performed according to the positive or negative of the difference between the third square-wave voltage string and the sine-wave voltage.

Therefore, the chopping frequencies of the first to third means, that is, the switching frequencies of the switch elements can be set much lower than the switching frequency of the conventional PWM-control inverter that produces many square-wave voltage strings in the positive or negative half period of the sine wave.

As a result, the switching loss can be decreased, and the element in which the conduction loss is reduced as the switch element can be selected. Additionally, the fourth means performs the PWM control to the voltage of the difference between the square-wave voltage string and the sine-wave voltage. Each of the square-wave voltage string and the sine-wave voltage alternately changes on the positive and negative sides. Therefore, the switching is performed at a voltage lower than that of the conventional PWM-control inverter, so that the switching loss can be reduced.

Thus, in the power conditioner of one or more embodiments of the invention, the power conversion efficiency can be improved compared with the conventional power conditioner.

Further, each of the measuring circuits measures the voltage between both ends of each of the first to and third capacitors, the control means performs ON/OFF control to each of the first to eighth switch elements based on the measured value of each measuring circuit, and the gain calibration means calibrates the gain of each measuring circuit that measures the voltage between both ends of each of the first to and third capacitors. Therefore, there is no error such that the measured value varies with respect to the identical voltage due to a variation of components constituting the measuring circuits, which allows a spike noise caused by the error to be prevented from being generated in the output voltage at a moment when the control means switches the turn-on and turn-off of the first to eighth switch element.

According to one or more embodiments of the invention, the DC voltage is chopped to produce the square-wave voltage string that alternately changes on the positive and negative sides in the sine-wave manner. Therefore, the chopping frequency for producing the square-wave voltage string, that is, the switching frequency of the switch element can be set much lower than the switching frequency of the conventional PWM-control inverter that produces many square-wave voltage strings in the positive or negative half period of the sine wave.

As a result, in one or more embodiments of the invention the switching losses can largely be decreased, and the element in which the conduction loss is reduced as the switch element can be selected. Additionally, in one or more embodiments of the invention, the PWM control is performed to the voltage of the difference between the square-wave voltage string and the sine-wave voltage. Each of the square-wave voltage string and the sine-wave voltage alternately changes on the positive and negative sides. Therefore, the switching can be performed at a voltage lower than that of the conventional PWM-control inverter. In one or more embodiments of the invention, the switching loss can be reduced from this point. As described above, in one or more embodiments of the invention, the power conversion efficiency can dramatically be enhanced compared with the conventional example.

Additionally, because the gain of each measuring circuit that measures the voltage between both ends of each of the first to and third capacitors is calibrated, the error caused by the variation of components constituting the measuring circuits is not generated in the measured value, which allows the spike noise caused by the error to be prevented from being generated in the output voltage at the moment when the control means switches the turn-on and turn-off of the first to eighth switch element.

BRIEF DESCRIPTION OF THE DRAWINGS

FIGS. 9A-9F are wave diagrams illustrating a waveform of each unit of FIG. 1;

DETAILED DESCRIPTION

Embodiments of the present invention will be described below with reference to the drawings. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

Figure 1:
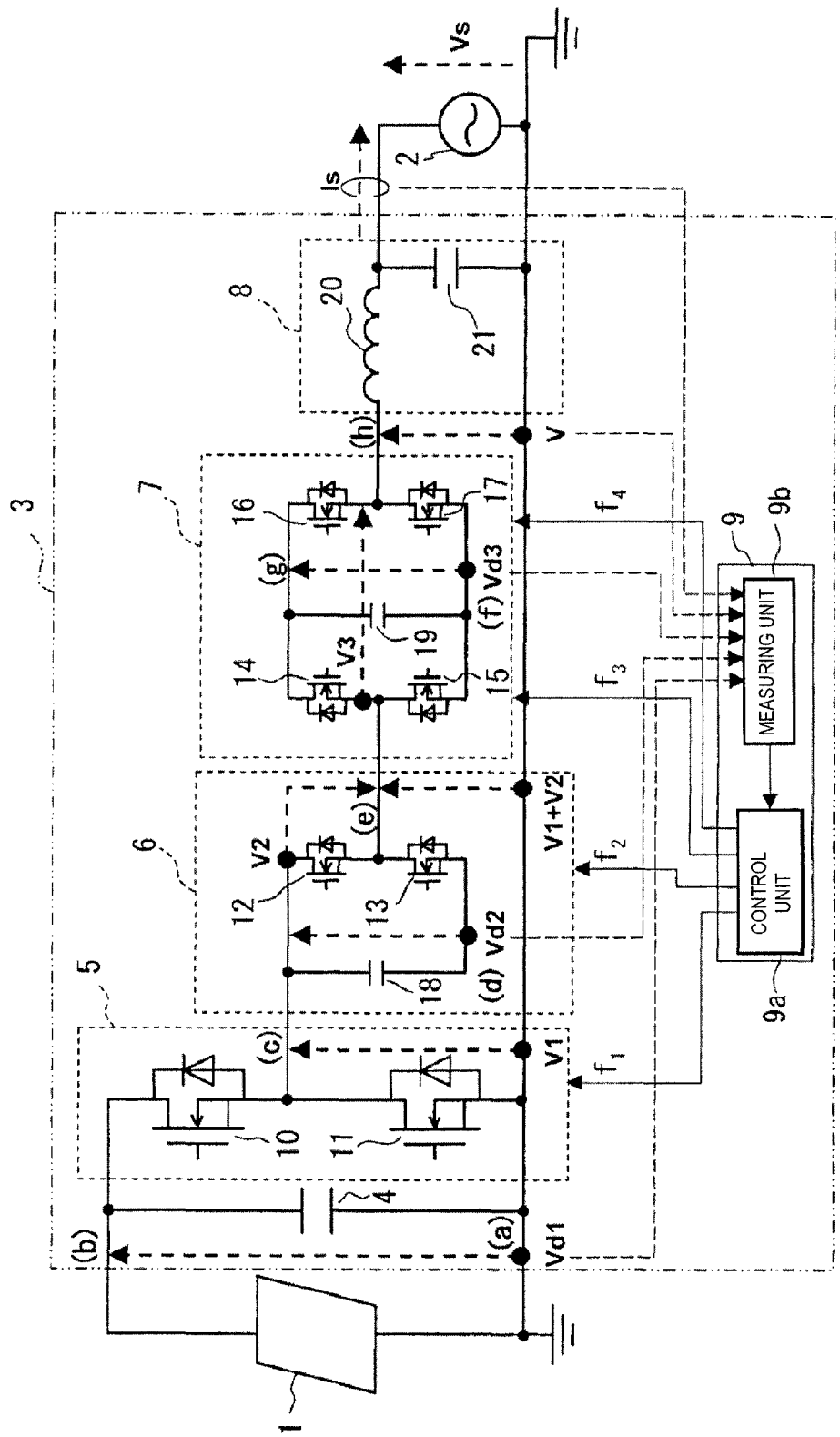
FIG. 1 is a circuit diagram of a photovoltaic power system according to one or more embodiments of the disclosure.

FIG. 1 is a configuration diagram of a photovoltaic power system according to one or more embodiments of the invention, and FIG. 1 illustrates a configuration of the single-phase two-wire system.

The photovoltaic power system of one or more embodiments includes a photovoltaic panel 1 and a power conditioner 3. The power conditioner 3 converts the DC power from the photovoltaic panel 1 into the AC power, and the power conditioner 3 is operated while interconnected to a commercial power source 2.

The photovoltaic panel 1 is configured such that a required generation power is obtained by connecting a plurality of photovoltaic modules in series and in parallel.

The photovoltaic panel 1 of one or more embodiments includes an amorphous silicon thin-film photovoltaic cell.

The power conditioner of one or more embodiments is a non-insulating type (transformer-less) power conditioner that does not includes the insulating transformer.

The power conditioner 3 includes a first capacitor 4 that is of a smoothing capacitor, first to third chopper circuits 5 to 7, a noise filter 8, and a control circuit 9 that controls each unit. The control circuit 9 outputs gate signals to control the first to third chopper circuits 5 to 7. The control circuit 9 includes a control unit 9a that calibrates the gain of the measuring circuit and a measuring unit 9b that measures the voltage and output current of each unit.

The first to third chopper circuits 5 to 7 and the control circuit 9 constitute a chopper converter that is connected in a cascade manner to the photovoltaic panel 1.

A negative electrode side of the photovoltaic panel 1 is grounded. A point (a) illustrated in FIG. 1 is the ground, and the ground has a voltage of zero. A point (b) indicates a positive electrode side of the photovoltaic panel 1.

The first capacitor 4 is connected in parallel between the positive and negative electrodes of the photovoltaic panel 1.

The first chopper circuit 5 is connected in parallel to the first capacitor 4.

The first chopper circuit 5 includes first and second switch elements 10 and 11 that are connected in series. Diodes are connected in reversely parallel to the first and second switch elements 10 and 11, respectively. The first chopper circuit 5 constitutes a first switch circuit by the first and second switch elements 10 and 11.

In the first chopper circuit 5, the first and second switch elements 10 and 11 are alternately ON/OFF-controlled at a system frequency, for example, a first frequency $f_1$ of 50 Hz by a gate signal from the control circuit 9. For example, the first and second switch elements 10 and 11 include N-channel MOSFETs similarly to switch elements 12 to 17 of the second and third chopper circuits 6 and 7. The switch element may be other switch elements such as an IGBT and a transistor in addition to the MOSFET.

The second chopper circuit 6 includes a second capacitor 18 and a second switch circuit. In the second switch circuit, the third and fourth switch elements 12 and 13 that are connected in series, and each of the switch elements 12 and 13 includes a diode that is connected in reversely parallel. The second capacitor 18 and the second switch circuit are connected in parallel. The third and fourth switch elements 12 and 13 are alternately ON/OFF-controlled at a second frequency $f_2$ by a gate signal from the control circuit 9. For example, the second frequency $f_2$ is set to 100 Hz that is double the first frequency $f_1$.

In the second chopper circuit 6, one end side of the parallel connection between the second capacitor 18 and the second switch circuit is connected to the series-connected portion of the first and second switch elements 10 and 11 of the first chopper circuit 5. The connection point is illustrated by a point (c) in FIG. 1. In FIG. 1, the points (c) and (d) correspond to both the capacitor electrode sides of the second capacitor 18.

The third chopper circuit 7 includes a third switch circuit, a third capacitor 19, and a fourth switch circuit. In the third switch circuit, the fifth and sixth switch elements 14 and 15 are connected in series, and each of the switch elements 14 and 15 includes a diode that is connected in reversely parallel. In the fourth chopper circuit, the seventh and eighth switch elements 16 and 17 are connected in series, and each of the switch elements 16 and 17 includes a diode that is connected in reversely parallel. In the third chopper circuit 7, the third switch circuit, the third capacitor 19, and the fourth switch circuit are connected in parallel. One end side and the other end side of the parallel connection among the circuits are illustrated by points (f) and (g) in FIG. 1. In FIG. 1, the points (f) and (g) correspond to both the capacitor electrode sides of the third capacitor 19.

The fifth and sixth switch elements 14 and 15 are alternately ON/OFF-controlled at a third frequency $f_3$ by a gate signal from the control circuit 9. For example, the third frequency $f_3$ is set to 150 Hz that is triple the first frequency The seventh and eighth switch elements 16 and 17 are alternately PWM-controlled at a high frequency f4 of, for example, 18 KHz by a gate signal from the control circuit 9.

The series-connected portion of the fifth and sixth switch elements 14 and 15 of the third chopper circuit 7 is connected to the series-connected portion of the third and fourth switch elements 12 and 13 of the second chopper circuit 6. The connection point is illustrated by a point (e) in FIG. 1.

The noise filter 8 including a reactor 20 and a fourth capacitor 21 is connected to the series-connected portion of the seventh and eighth switch elements 16 and 17 of the third chopper circuit 7. The connection point is illustrated by a point (h) in FIG. 1.

A load (not illustrated) and the commercial power source 2 are connected to the noise filter 8.

The control circuit 9 measures a system voltage Vs and a system current Is through a differential amplifying circuit (not illustrated) of the measuring unit 9b to compute a command value V* of a sine-wave target voltage synchronized with a system frequency of the commercial power source 2 as is conventionally done, and the control circuit 9 measures voltages Vd1, Vd2, and Vd3 at both ends of the first to third capacitors 4, 18, and 19 to produce the gate signals in order to control the chopper circuits 5 to 7.

The voltage Vd1 is a DC output voltage of the photovoltaic panel 1, which emerges at the point (b) based on the voltage at the point (a) that is the ground.

The voltage Vd2 is a charge voltage at the point (c) of one of the capacitor electrodes of the second capacitor 18 in the second chopper circuit 6 based on the point (d) of the other capacitor electrode in the second capacitor 18.

The voltage Vd3 is a charge voltage at the point (g) of one of the capacitor electrodes of the third capacitor 19 in the third chopper circuit 7 based on the point (f) of the other capacitor electrode in the third capacitor 19.

Figure 2:
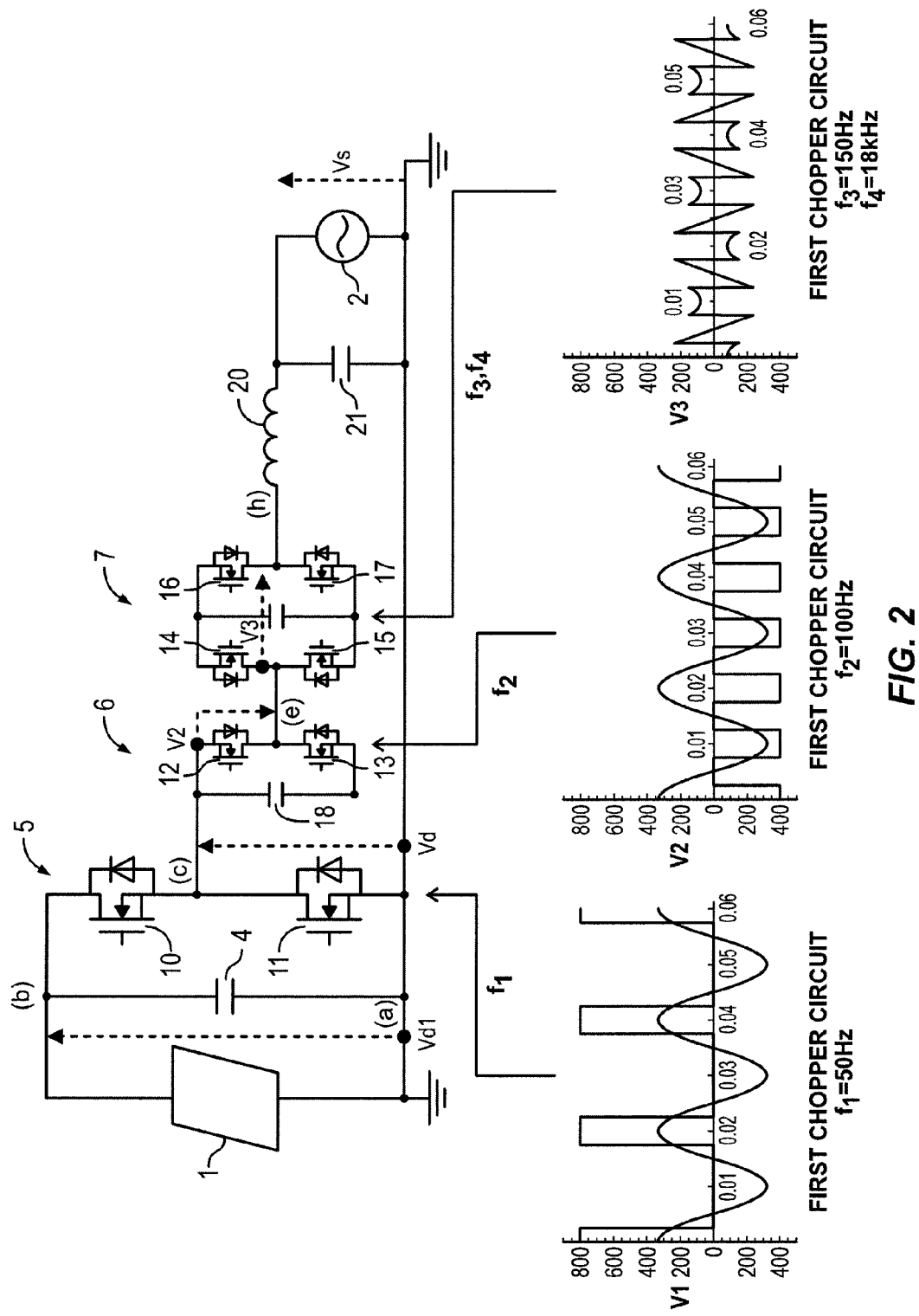
FIG. 2 is a view comprised of wave diagrams corresponding to portions of a circuit diagram which explains an operation of a power conditioner of FIG. 1.

FIG. 2 is a schematic diagram for explaining an operation of each of the chopper circuits 5 to 7 of one or more embodiments, FIG. 2A illustrates a configuration of a main part of FIG. 1, and FIG. 2B to FIG. 2D illustrates voltages V1, V2, and V3 of FIG. 2A. In FIG. 2B and FIG. 2C, the waveform of the command value V* of the sine-wave target voltage synchronized with the system is illustrated by a thin solid line.

The voltage V1 is a voltage at the point (c) that is of the series-connected portion of the first and second switch elements 10 and 11 of the first chopper circuit 5 when a potential at the point (a) that is of the ground is set to a first reference potential.

The voltage V2 is a voltage at the point (e) that is of the series-connected portion of the third and fourth switch elements 12 and 13 of the second chopper circuit 6 when a potential at the point (c) is set to a second reference potential.

The voltage V3 is a voltage at the point (h) that is of the series-connected portion of the seventh and eighth switch elements 16 and 17 based on the point (e) that is of the series-connected portion of the fifth and sixth switch elements 14 and 15 in the third chopper circuit 7.

In the first chopper circuit 5, the first and second switch elements 10 and 11 are alternately ON/OFF-controlled at the first frequency $f_1$ of 50 Hz when the first frequency $f_1$ is identical to the system frequency of 50 Hz of the commercial power source 2.

Therefore, the voltage V1 at the point (c) that is of the series-connected portion of the first and second switch elements 10 and 11 becomes a first square-wave voltage string including a plurality of square-wave voltages that rise on a positive side as illustrated in FIG. 2B. A square-wave voltage level of the voltage V1 becomes the DC output voltage Vd1 of the photovoltaic panel 1.

In the second chopper circuit 6, the third and fourth switch elements 12 and 13 are alternately ON/OFF-controlled at the second frequency $f_2$ of 100 Hz that is double the first frequency $f_1$.

Therefore, as illustrated in FIG. 2B, the voltage V2 at the point (e) that is of the series-connected portion of the third and fourth switch elements 12 and 13 becomes a second square-wave voltage string including a plurality of square-wave voltages that fall on a negative side based on the point (c) that is of the series-connected portion of the first and second switch elements 10 and 11.

A square-wave voltage level of the voltage V2 is controlled so as to become a half of the DC output voltage Vd1.

Figure 4B:
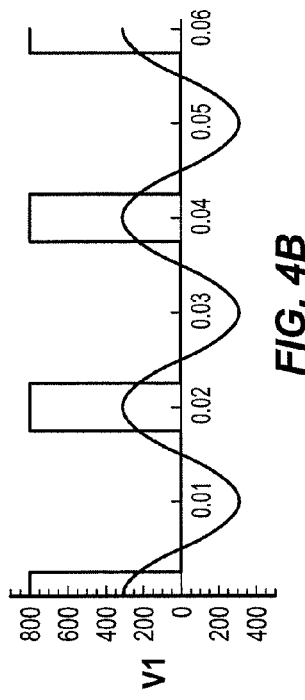
FIGS. 4B, 4C, and 4D are wave diagrams explaining an operation principle of a second chopper circuit of FIG. 1.
Figure 4C:
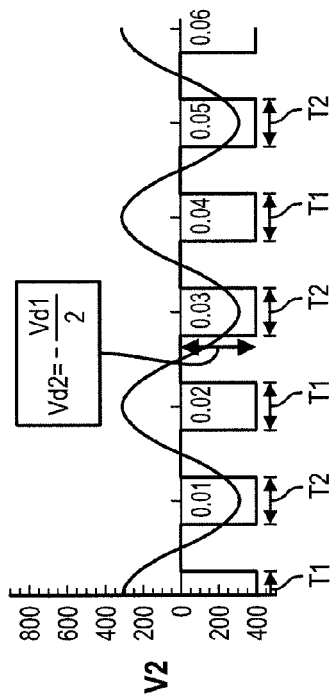
Figure 4D:
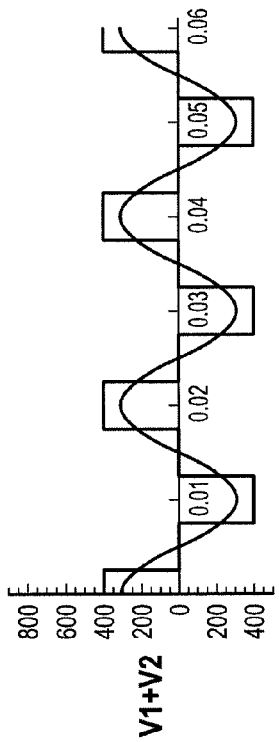

As illustrated in FIG. 4D, the voltage V2 at the point (e) that is of the series-connected portion of the third and fourth switch elements 12 and 13 of the second chopper circuit 6 becomes a voltage V1+V2 that is the sum of the voltage V1 between the points (a) and (c) and the voltage V2 between the voltage V2 between the points (c) and (e) based on the point (a) that is of the ground, that is, the first reference potential. The voltage V1+V2 has a stepwise waveform corresponding to the sine wave that alternately changes positively and negatively. The stepwise voltage V1+V2 alternately changes positively and negatively in synchronization with the command value V* of the sine-wave target voltage illustrated by the thin solid line of FIG. 4D.

In the third chopper circuit 7, the fifth and sixth switch elements 14 and 15 are alternately ON/OFF-controlled at the third frequency $f_3$ of 150 Hz that is triple the first frequency $f_1$ so as to compensate a difference voltage between the voltage V1+V2 having the stepwise waveform and the command value V* of the sine-wave target voltage, and the seventh and eighth switch elements 16 and 17 are PWM-controlled at the frequency f4 of 18 KHz.

Therefore, as illustrated in FIG. 2D, the voltage V3 at the point (h) that is of the series-connected portion of the seventh and eighth switch elements 16 and 17 of the third chopper circuit 7 illustrated in FIG. 2A corresponds to the difference voltage between the voltage V1+V2 (FIG. 4D) having the stepwise waveform and the command value V* of the sine-wave target voltage when being illustrated by an average value of PWM based on the point (e) that is of the series-connected portion of the fifth and sixth switch elements 14 and 15.

Accordingly, the voltage V3 at the point (h) that is of the series-connected portion of the seventh and eighth switch elements 16 and 17 of the third chopper circuit 6 becomes a sine-wave voltage corresponding to the command value V* of the sine-wave target voltage synchronized with the commercial power source 2 based on the first reference potential at the point (a) that is of the ground.

Then operation principle of the first to third chopper circuits 5 to 7 will be described in detail below.

Figure 3B:
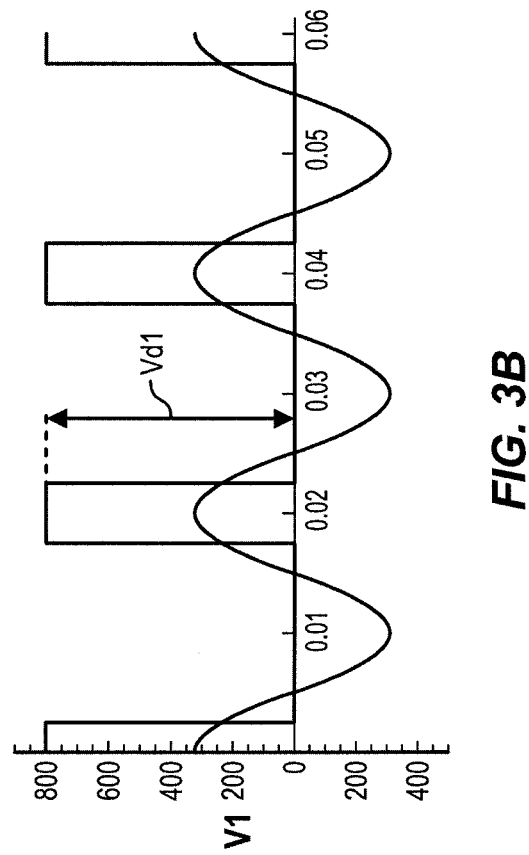
FIG. 3B is a view of a wave diagram explaining an operation principle of a first chopper circuit of FIG. 1.
Figure 3A:
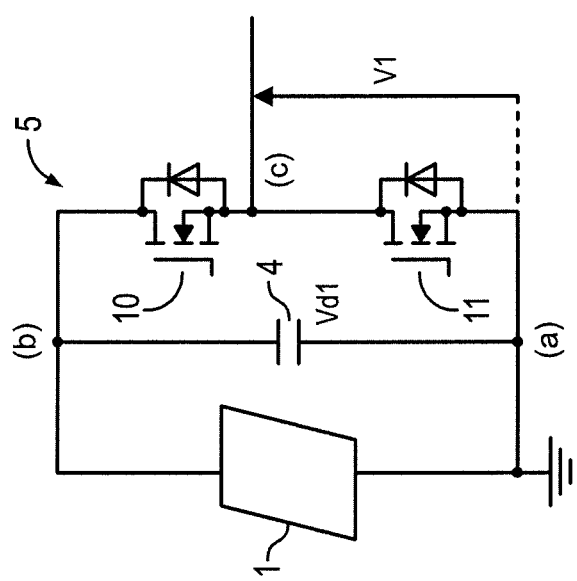
FIG. 3A is a view of a circuit diagram explaining an operation principle of a first chopper circuit of FIG. 1.

FIGS. 3A and 3B explain the operation principle of the first chopper circuit 5. Specifically, FIG. 3A illustrates the photovoltaic panel 1, the first capacitor 4, and the first chopper circuit 5, and FIG. 3B illustrates the voltage V1 between the points (a) and (c). Particularly, in FIG. 3B, the command value V* of the sine-wave target voltage is illustrated by the thin solid line.

The DC output voltage Vd1 of the photovoltaic panel 1 emerges at the point (b) on the positive electrode side of the photovoltaic panel 1. The DC output voltage Vd1 is smoothed by the first capacitor 4 when the potential at the point (a) that is of the ground is set to the first reference potential.

In the first chopper circuit 5, the DC output voltage Vd1 is chopped by the first and second switch elements 10 and 11 that are alternately ON/OFF-controlled at the first frequency $f_1$ of 50 Hz.

When the first switch element 10 is turned on while the second switch element 11 is turned off, the charge voltage Vd1 at the first capacitor 4 that is of the voltage at the point (b) emerges at the point (c) that is of the series-connected portion of the first and second switch elements 10 and 11 of the first chopper circuit 5.

When the first switch element 10 is turned off while the second switch element 11 is turned on, the ground voltage at the point (a) emerges at the point (c) that is of the series-connected portion of the first and second switch elements 10 and 11 of the first chopper circuit 5.

Accordingly, as described above, the voltage V1 at the point (c) that is of the series-connected portion of the first and second switch elements 10 and 11 becomes the first square-wave voltage string including the plurality of square-wave voltages that rise on the positive side when the ground potential is set to the first reference potential as illustrated in FIG. 3B. The voltage V1 is the voltage at the point (c) that is of the series-connected portion of the first and second switch elements 10 and 11 based on the point (a), and the square-wave voltage level becomes the DC output voltage Vd1 of the photovoltaic panel 1, for example, 800 V.

In the first chopper circuit 5, the effective power can be output because the square-wave voltage string whose phase is matched with that of the system voltage is produced.

Figure 4A:
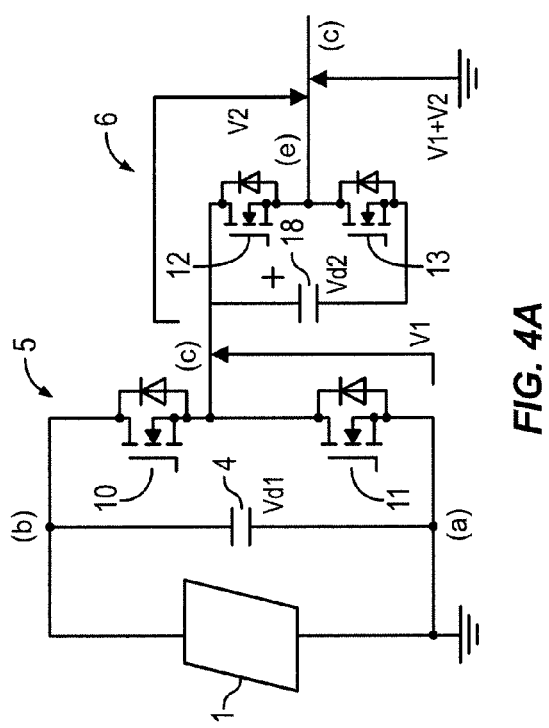
FIG. 4A is a view of a circuit diagram explaining an operation principle of a second chopper circuit of FIG. 1.

FIGS. 4A-4D explain the operation principle of the second chopper circuit 6. Specifically, FIG. 4A illustrates the first chopper circuit 5 and the second chopper circuit 6, FIG. 4B illustrates the voltage V1, FIG. 4C illustrates the voltage V2, and FIG. 4D illustrates the voltage V1+V2. In FIG. 4B to FIG. 4D, the command value V* of the sine-wave target voltage is also illustrated by the thin solid line.

In the second chopper circuit 6, the voltage V1 at the point (c) illustrated in FIG. 4B is chopped by the third and fourth switch elements 12 and 13 that are alternately ON/OFF-controlled at the second frequency $f_2$ of 100 Hz.

When the third switch element 12 is turned on while the fourth switch element 13 is turned off, the potential at the point (e) that is of the series-connected portion of the third and fourth switch elements 12 and 13 becomes the same potential as the point (c) that is of the series-connected portion of the first and second switch elements 10 and 11 of the first chopper circuit 5. When the third switch element 12 is turned off while the fourth switch element 13 is turned on, the potential at the point (e) that is of the series-connected portion of the third and fourth switch elements 12 and 13 becomes more negative than the potential at the point (c). Accordingly, as described above, the voltage V2 at the point (e) that is of the series-connected portion of the third and fourth switch elements 12 and 13 becomes the second square-wave voltage string including the plurality of square-wave voltages that fall on the negative side when the potential at the point (c) that is of the series-connected portion of the first and second switch elements 10 and 11 is set to the second reference potential as illustrated in FIG. 4C.

When the first switch element 10 of the first chopper circuit 5 is turned on while the second switch element 11 is turned off, the third switch element 12 of the second chopper circuit 6 is turned off while the fourth switch element 13 is turned on, thereby charging the second capacitor 18. When the first switch element 10 of the first chopper circuit 5 is turned off while the second switch element 11 is turned on, the third switch element 12 of the second chopper circuit 6 is turned off while the fourth switch element 13 is turned on, thereby discharging the charge accumulated in the second capacitor 18 through the turned-on switch elements 11 and 13. As illustrated in FIG. 4C, in the second capacitor 18 the charge during a charge period T1 and the discharge during a discharge period T2 are alternately repeated to produce the square-wave voltage that falls on the negative side based on the second reference potential at the point (c). The square-wave voltage level Vd2 becomes a half (Vd2=−Vd½) of the DC output voltage Vd1 of the photovoltaic panel 1, for example, 400 V.

The voltage V2 is a voltage at the point (e) that is of the series-connected portion of the third and fourth switch elements 12 and 13 based on the point (c) that is of the series-connected portion of the first and second switch elements 10 and 11. Accordingly, in the second chopper circuit 6, the voltage V1+V2 that is the sum of the voltage V1 between the points (a) and (c) illustrated in FIG. 4B and the voltage V2 between the points (c) and (e) illustrated in FIG. 4C emerges at the point (e) when the point (a) that is of the ground is set to the first reference potential. The voltage V1+V2 has the stepwise waveform that alternately changes positively and negatively according to the change of the command value V* of the sine-wave target voltage illustrated in FIG. 4D.

In the second chopper circuit 6, even-numbered-order high-harmonics can be removed because the square-wave voltage string that falls on the negative side is produced, and the effective power becomes zero in principle because the charge and discharge are repeated at the equal power.

The system current Is of FIG. 9C is passed through the second capacitor 18, thereby performing the charge and the discharge. When the system current Is of FIG. 9C is positive, the second capacitor 18 is charged by the sine-wave current during the period T1 of FIG. 4C. Therefore, the voltage V2 is gradually decreased during the period T1 in the actual operation. Similarly, when the system current Is of FIG. 9C is negative, the second capacitor 18 is discharged by the sine-wave current during the period T2 of FIG. 4C. Therefore, the voltage V2 is gradually increased during the period T2 in the actual operation.

Figure 5:
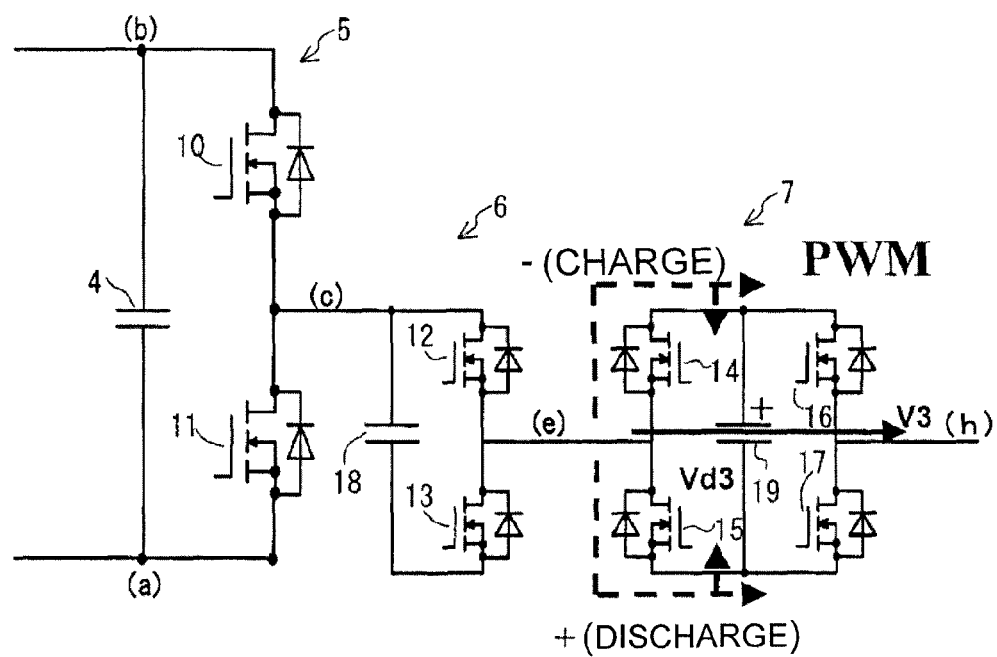
FIG. 5 is a view of a circuit diagram explaining an operation principle of a third chopper circuit of FIG. 1.
Figure 6A:
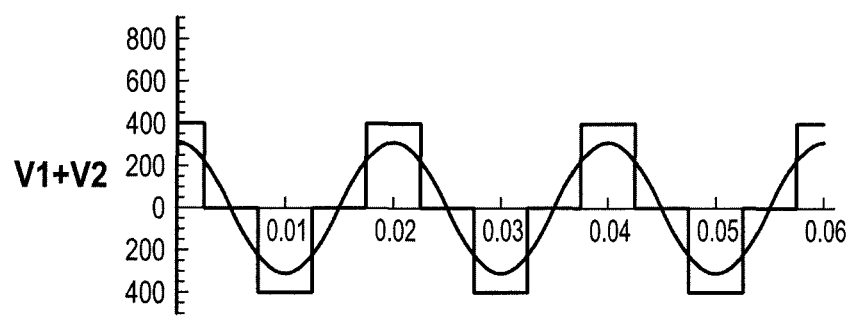
FIGS. 6A and 6B are wave diagrams illustrating a voltage waveform of each unit of FIG. 5.
Figure 6B:
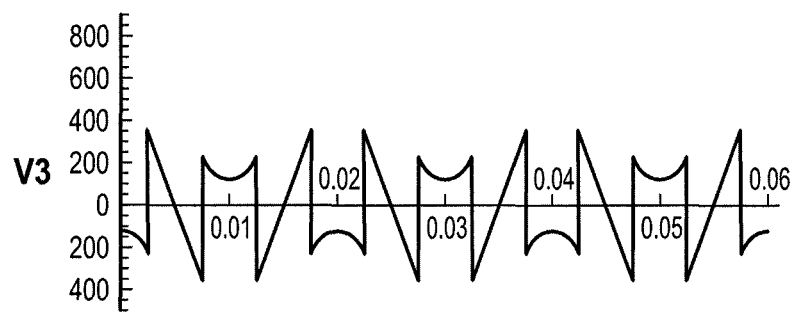

FIG. 5 is a view for explaining the operation principle of the third chopper circuit 7, FIG. 6A illustrates the voltage V1+V2 having the stepwise waveform, and FIG. 6B illustrates the voltage V3 at the point (h) that is of the series-connected portion of the seventh and eighth switch elements 16 and 17 as the average value of PWM based on the point (e) that is of the series-connected portion of the fifth and sixth switch elements 14 and 15. In FIG. 6A, the command value V* of the sine-wave target voltage is also illustrated by the thin solid line.

The fifth and sixth switch elements 14 and 15 are ON/OFF-controlled in timing corresponding to the positive and negative of the difference voltage between the voltage V1+V2 having the stepwise waveform at the point (e) illustrated in FIG. 6A and the command value V* of the sine-wave target voltage. As a result, the third capacitor 19 is charged and discharged by the voltage V1+V2 at the time the fifth and sixth switch elements 14 and 15 are ON/OFF-controlled.

In other words, when a relational expression of voltage V1+V2> command value V* of sine-wave target voltage holds, the difference voltage is positive, the control is performed such that the fifth switch element 14 is turned on while the sixth switch element 15 is turned off, whereby the third capacitor 19 is charged by the voltage V1+V2.

On the other hand, when a relational expression of voltage V1+V2< command value V* of sine-wave target voltage holds, the difference voltage is negative, the control is performed such that the fifth switch element 14 is turned off while the sixth switch element 15 is turned on, thereby discharging the voltage charged in the third capacitor 19.

A period of a magnitude relation of the difference voltage is the third frequency $f_3$ of 150 Hz, and therefore the fifth and sixth switch elements 14 and 15 are alternately ON/OFF-controlled at the third frequency $f_3$.

In the third chopper circuit 7, the seventh and eighth switch elements 16 and 17 are PWM-controlled at the fourth frequency f4 that is hundreds times the first frequency $f_1$ with a duty that corrects the difference voltage between the voltage V1+V2 and the command value V* of the sine-wave target voltage. Therefore, as illustrated in FIG. 6B, the voltage V3 corresponding to the difference voltage between the voltage V1+V2 having the stepwise waveform and the command value V* of the sine-wave target voltage emerges at the point (h) that is of the series-connected portion of the seventh and eighth switch elements 16 and 17. The voltage V3 indicates the average value of the PWM, and the voltage V3 is a voltage at the point (h) that is of the series-connected portion of the seventh and eighth switch elements 16 and 17 based on the point (e) that is of the series-connected portion of the fifth and sixth switch elements 14 and 15.

Accordingly, the command value V* of the sine-wave target voltage whose phase is identical to that of the change in power system frequency illustrated by the thin solid line of FIG. 6A at the point (h) that is of the series-connected portion of the seventh and eighth switch elements 16 and 17 based on the first reference potential at the point (a) that is of the ground. The command value V* of the sine-wave target voltage is the sum of the voltage V1+V2 between the points (a) and (e) illustrated in FIG. 6A and the voltage V3 between the points (e) and (h) illustrated in FIG. 6B.

In the third chopper circuit 7, the difference with the sine-wave voltage is eliminated while the chopping is performed at the frequency that is triple the system frequency, so that at least three-order high-harmonic can be suppressed.

The chopper control of the first to third chopper circuits 5 to 7 by the chopper circuit of FIG. 1 will be described in detail below.

The control circuit 9 controls pulse widths of the plurality of square-wave voltages that rise on the positive side of FIG. 3B using the gate signal output to the first and second switch elements 10 and 11 of the first chopper circuit 5.

That is, a fundamental-wave component of the output voltage of the first chopper circuit 5 is controlled so as to be matched with a fundamental-wave voltage of a system power source, and a pulse width δ of the square-wave voltage is controlled so as to become a value computed by the following equation.

$$\delta = \sin^{-1}[(\sqrt{2}\pi V)/(2\,Vd1)]$$

Where V is an effective value of a voltage Vs of the system power source.

The fundamental-wave voltage can be increased and decreased when the pulse width is adjusted by $\Delta\delta_1$, and $\Delta\delta_1$ is computed by multiplying a factor by an error between the measured voltage Vd3 and the target voltage Vd3*.

Using the gate signal output to the third and fourth switch elements 12 and 13 of the second chopper circuit 6, the control circuit 9 performs the control such that voltage Vd2 illustrated in FIG. 4C becomes a half of the voltage Vd1 of the first chopper circuit 5.

When the third and fourth switch elements 12 and 13 of the second chopper circuit 6 are ON/OFF-controlled by the gate signals, the second capacitor 18 repeats the charge and discharge to produce the plurality of square-wave voltage strings that rise on the negative side illustrated in FIG. 4C. The charge period T1, that is, the pulse width of the square wave corresponding to the charge is identical to the pulse width of the square wave output from the first chopper circuit 5, and the discharge period T2, that is, the pulse width of the square wave corresponding to the discharge is a pulse width in which the pulse width of the square wave corresponding to the charge is finely adjusted only by $\Delta\delta_2$.

$\Delta\delta_2$ is computed by multiplying a factor by an error between the measured voltage Vd2 and the target voltage Vd2*. The target voltage Vd2* is set to the voltage that is a half of the measured voltage Vd1.

The control circuit 9 controls the pulse width of the square-wave voltage according to a fluctuation in power-generation output of the photovoltaic panel 1.

Figure 7A:
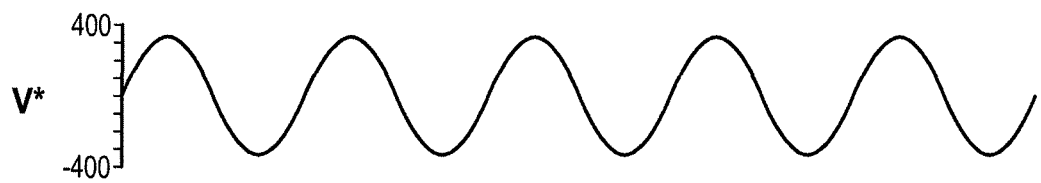
FIGS. 7A, 7B, and 7C are wave diagrams illustrating a voltage of each unit for an input voltage of 800 V.
Figure 7B:
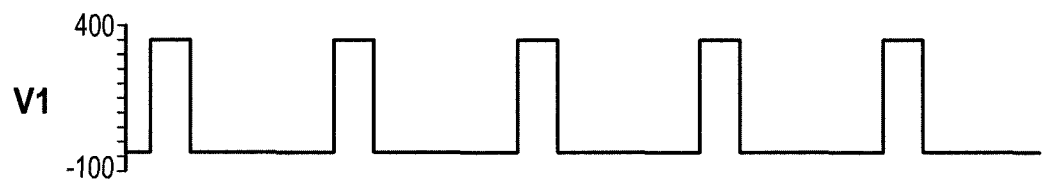
Figure 7C:
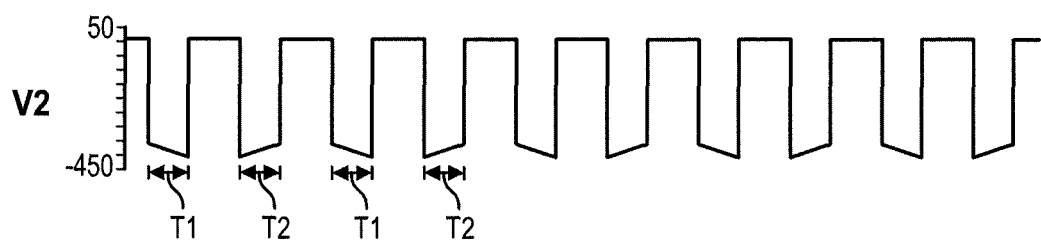
Figure 8A:
FIGS. 8A, 8B, and 8C are wave diagrams illustrating a voltage of each unit for an input voltage of 520 V.
Figure 8B:
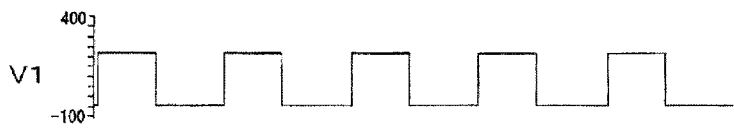
Figure 8C:
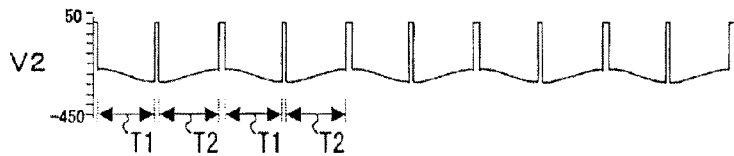

FIGS. 7A-7C and FIGS. 8A-8C illustrate simulation waveforms of the positive-side and negative-side square-wave voltages V1 and V2 when the input voltage Vd1 from the photovoltaic panel 1 fluctuates. FIGS. 7A-7C illustrate the input voltage Vd1 of 800 V, and FIGS. 8A-8C illustrate the input voltage Vd1 of 520 V.

FIG. 7A and FIG. 8A illustrate the command value V* of the sine-wave target voltage. FIG. 7B and FIG. 8B illustrate the positive-side voltage V1 by the first chopper circuit 5. FIG. 7C and FIG. 8C illustrate the negative-side voltage V2 by the second chopper circuit 6.

When the input voltage Vd1 is decreased, both the pulse widths of the positive-side square wave illustrated in FIG. 8B and the negative-side square wave illustrated in FIG. 8C are controlled so as to be widened compared with those of FIGS. 7A-7C.

The control circuit 9 alternately performs the ON/OFF control to the fifth and sixth switch elements 14 and 15 of the third chopper circuit 7 in timing according to the positive or negative of the difference between the stepwise voltage V1+V2 illustrated in FIG. 6A and the command value V* of the sine-wave target voltage, and the control circuit 9 performs the PWM control to the seventh and eighth switch elements 16 and 17 at a high frequency with a duty that corrects the difference voltage, thereby producing the sine-wave voltage of the command value V* of the sine-wave target voltage.

FIGS. 9A-9F illustrate a simulation waveform of each unit of FIG. 1, and the simulation waveform is obtained based on the ground.

FIG. 9A illustrates the system voltage Vs, FIG. 9B illustrates the output voltage V of the third chopper circuit 7, FIG. 9C illustrates the system current Is, FIG. 9D illustrates the voltage V1 and V2 (broken line), FIG. 9E illustrates the voltage V3, and FIG. 9F illustrates the voltages Vd2 and Vd3 (broken line).

In one or more embodiments, as described above, the first and second switch elements 10 and 11 of the first chopper circuit 5 switch the voltage of 800 V at the first frequency $f_1$ of 50 Hz, the third and fourth switch elements 12 and 13 of the second chopper circuit 6 switch the voltage of 400 V at the second frequency $f_2$ of 100 Hz, and the fifth and sixth switch elements 14 and 15 of the third chopper circuit 7 switch the voltage of 260 V at the third frequency $f_3$ of 150 Hz. That is, the switch elements 10 to 15 perform the switching at the frequencies that are much lower than the PWM frequency of the conventional PWM-control power conditioner.

The seventh and eighth switch elements 16 and 17 of the third chopper circuit 7 performs the PWM control to the voltage of about 260 V that is of the difference voltage between the stepwise voltage V1+V2 and the command value V* of the sine-wave target voltage at a frequency as high as 18 KHz. That is, the seventh and eighth switch elements 16 and 17 switch the voltage that is lower than that of the PWM-control inverter of the conventional power conditioner.

The first to sixth switch elements 10 to 15 of the first to third chopper circuits 5 to 7 perform the switching at the frequencies that is much lower than those of the conventional PWM control, so that the switching loss can be reduced and the low-conduction-loss switch element or the inexpensive switch element can be selected. On the other hand, the seventh and eighth switch elements 16 and 17 of the third chopper circuit 7 switch the voltage that is lower than that of the conventional PWM control, so that the switching loss can be reduced.

Therefore, the power conversion efficiency of the power conditioner 3 can be improved compared with the conventional power conditioner.

The square-wave voltage producing means includes the first chopper circuit 5, the second chopper circuit 6, the fifth and sixth switch elements 14 and 15 and the third capacitor 19 of the third chopper circuit 7, and the control circuit 9 that controls each unit. The sine-wave voltage producing means includes the seventh and eighth switch elements 16 and 17 of the third chopper circuit 7 and the control circuit 9 that controls the switch elements 16 and 17.

In one or more embodiments, as described above, the photovoltaic panel 1 includes the amorphous silicon thin-film photovoltaic cell.

In the amorphous silicon photovoltaic cell, it is well known that aging degradation is generated when the potential at the negative electrode side becomes lower than the ground potential. Therefore, for the purpose of the countermeasure, it is necessary to set the negative electrode side to the ground potential.

Figure 18:
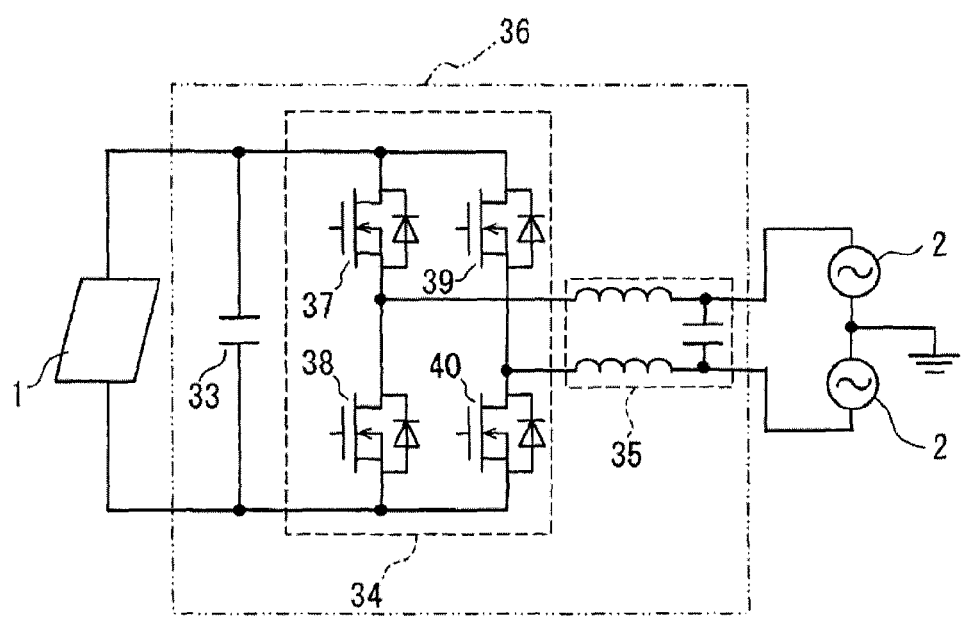
FIG. 18 is a circuit diagram of a conventional example.

However, in the conventional non-insulating type power conditioner 36 illustrated in FIG. 18, because the DC side differs from the AC side in the level of the reference potential, the negative electrode side of the photovoltaic cell, which is of the input side of the power conditioner 36, cannot be set to the ground potential. On the other hand, in one or more embodiments, because the DC side is identical to the AC side in the level of the reference potential, the negative electrode side of the photovoltaic cell can be set to the ground potential.

Figure 10:
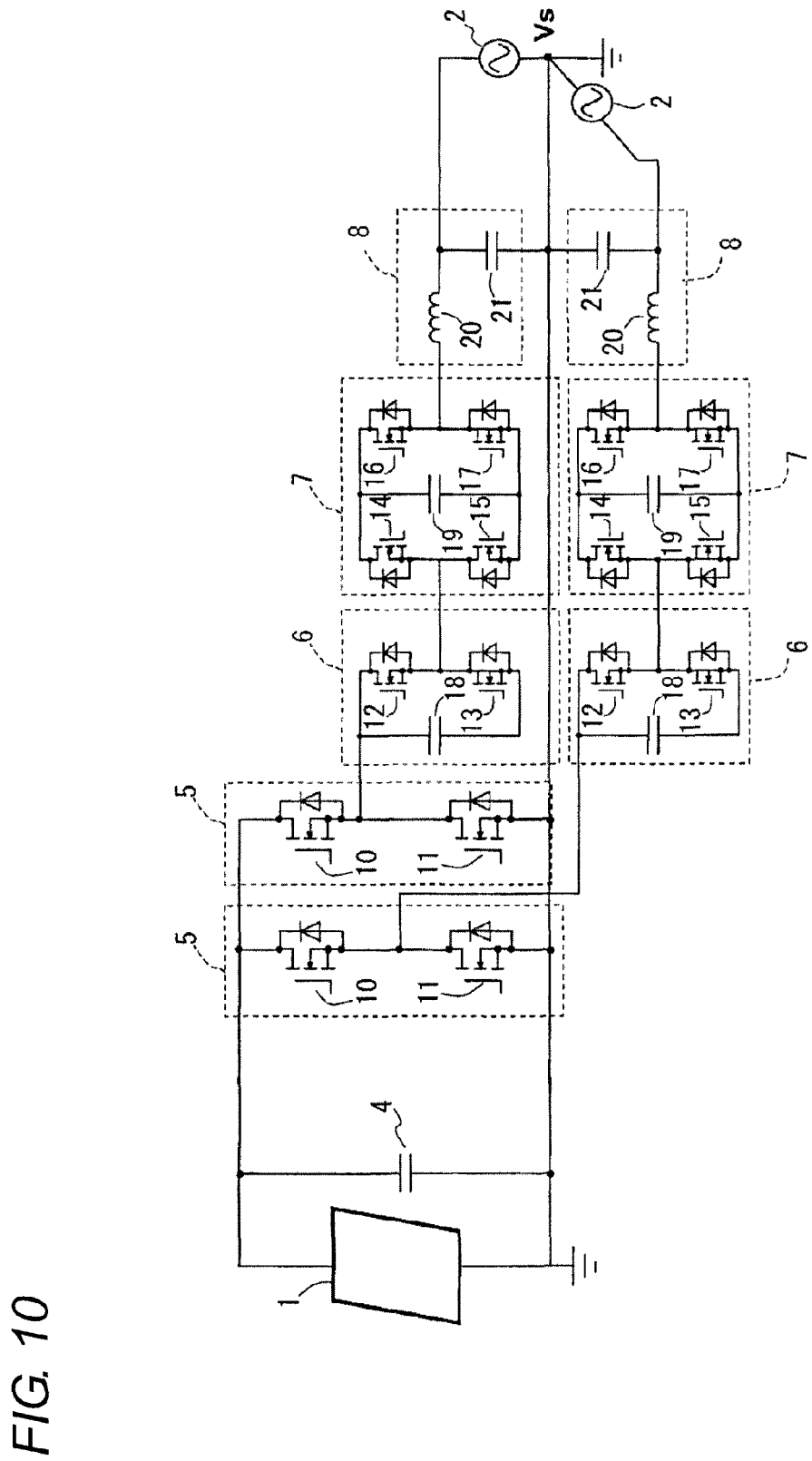
FIG. 10 is a circuit diagram of a single-phase three-wire system.
Figure 11:
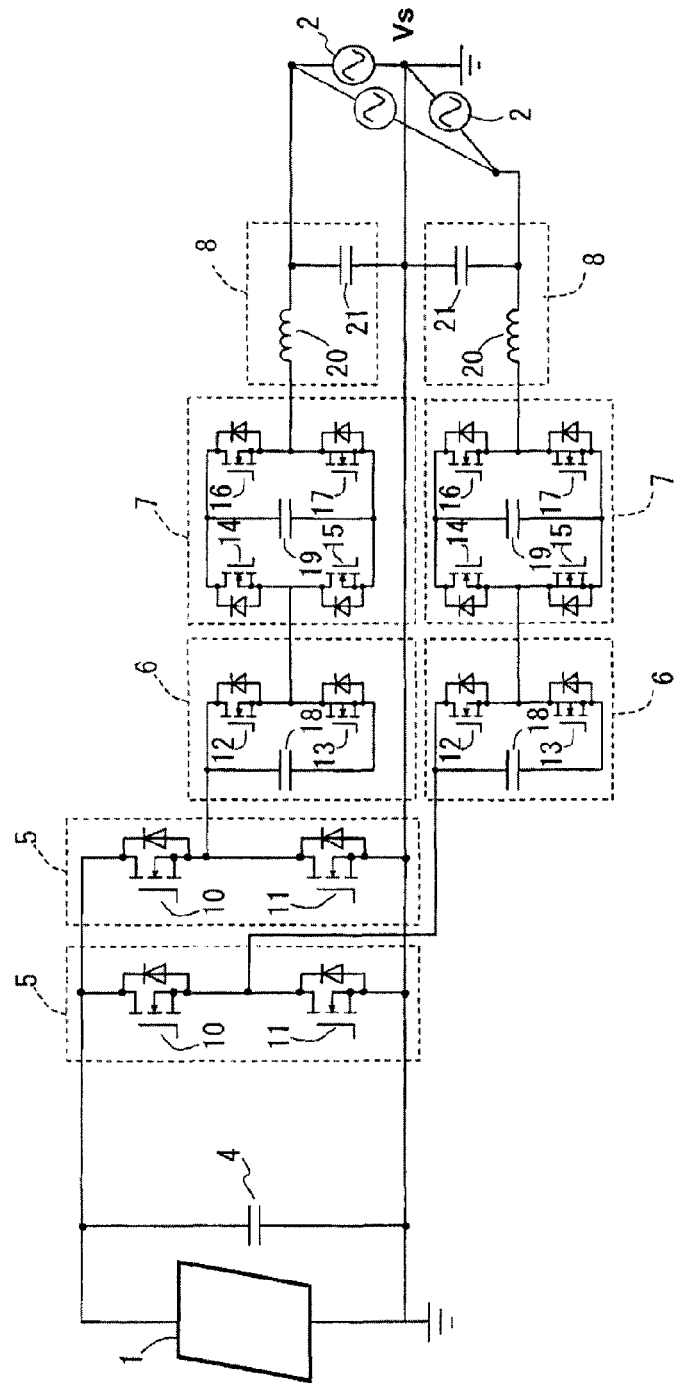
FIG. 11 is a circuit diagram of a three-phase three-wire system.
Figure 12:
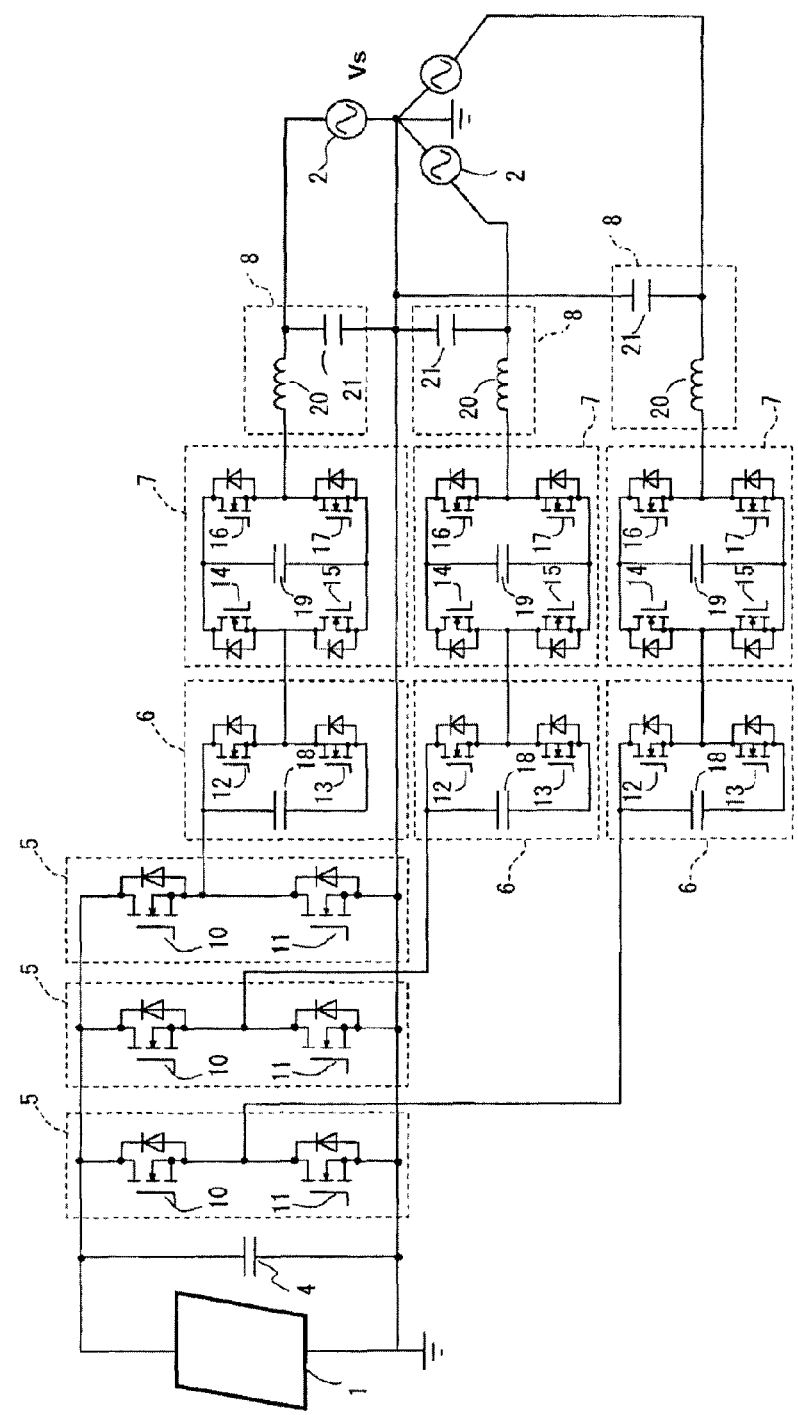
FIG. 12 is a circuit diagram of a three-phase four-wire system.

In one or more embodiments, the photovoltaic power system is applied to the single-phase two-wire system. In other embodiments, the photovoltaic power system of one or more embodiments of the invention may be applied to a single-phase three-wire system illustrated in FIG. 10, a three-phase three-wire system illustrated in FIG. 11, and a three-phase four-wire system illustrated in FIG. 12.

Figure 13:
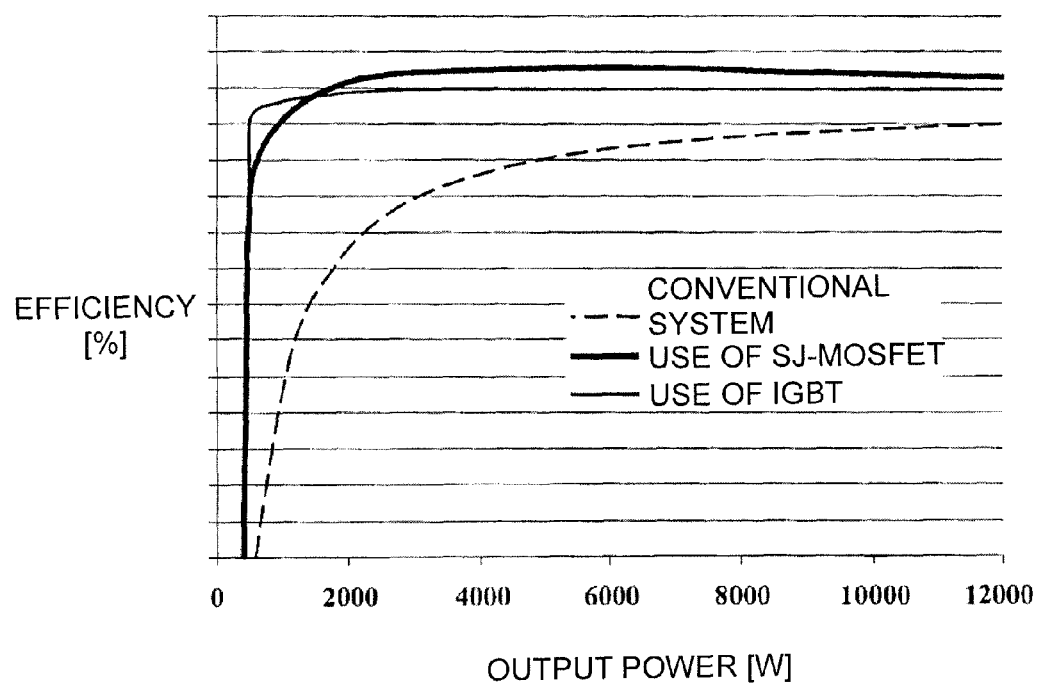
FIG. 13 is a view illustrating characteristics of one or more embodiments and a conventional system.
Figure 14:
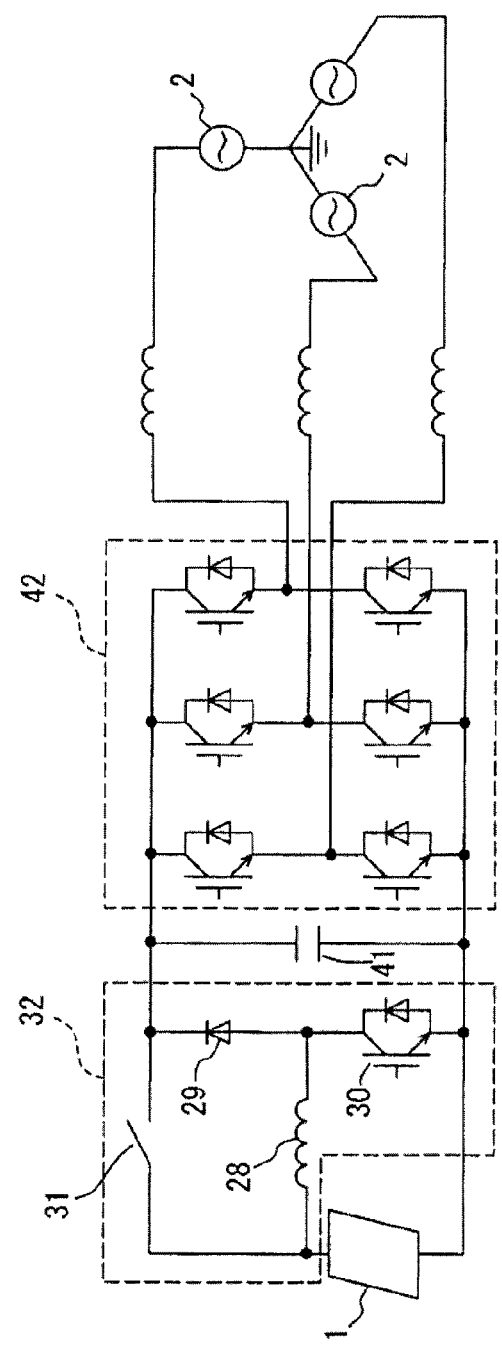
FIG. 14 is a circuit diagram of the conventional system of FIG. 13.
Figure 15:
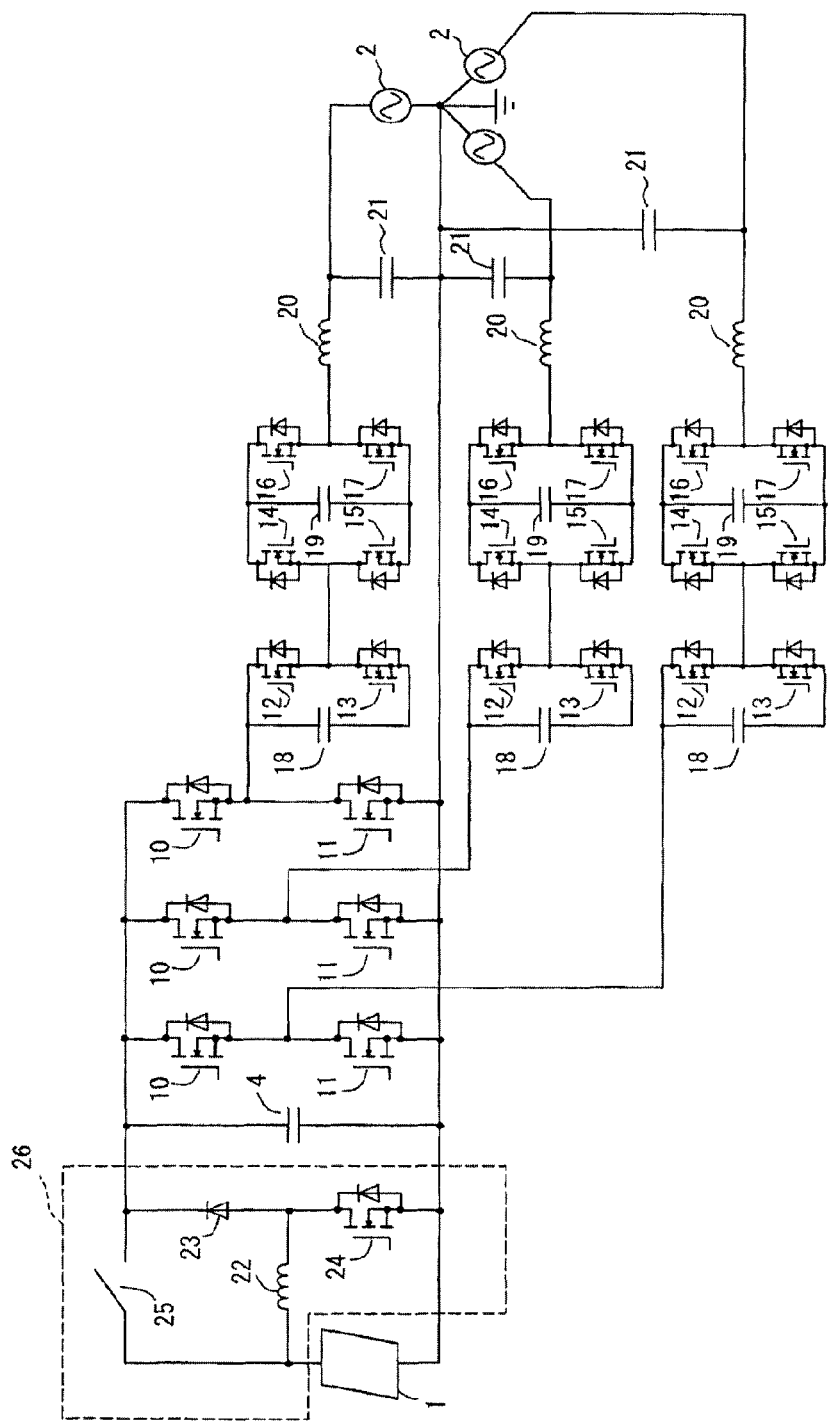
FIG. 15 is a circuit diagram of a photovoltaic power system according to other embodiments of the invention.

FIG. 13 illustrates comparison of characteristics of a three-phase four-wire system of an embodiment of one or more embodiments of the invention illustrated in FIG. 15 and a conventional system illustrated in FIG. 14. In FIG. 13, a horizontal axis indicates the output power (W) and a vertical axis indicates the efficiency (%). In FIG. 13, the solid line expresses the characteristic of one or more embodiments, a bold solid line expresses the characteristic in which an SJ (Super Junction) MOSFET is used as the switch element, a thin solid line expresses the characteristic in which an IGBT is used as the switch element, and a broken line expresses the characteristic of the conventional system.

FIG. 13 illustrates the characteristics for the inter-system-line voltage of 400 V and the input voltage of 570 V. As illustrated in FIG. 14, the conventional system is the non-insulating type power conditioner including a boost circuit 32, a smoothing capacitor 41, and a PWM-control inverter 42. The boost circuit 32 includes a reactor 28, a diode 29, an IGBT 30, and a switch 31.

As can be seen from FIG. 13, in one or more embodiments, the efficiency is improved compared with the conventional system.

Additionally, in one or more embodiments, the following method is adopted such that the spike noise is not generated in the output voltage.

As described above, the command value V* of the sine-wave target voltage is computed by referring to the measured voltages Vd1, Vd2, and Vd3.

At this point, the voltages Vd1, Vd2, and Vd3 are measured by the corresponding measuring circuits in the measuring unit 9b of the control circuit 9. Occasionally the measured value varies even at the identical voltage due to the variation of components constituting the measuring circuits, and particularly, the difference of the measured value is increased in a high-temperature place or a low-temperature place.

When an error is generated among the measuring circuits that measure the voltages Vd1, Vd2, and Vd3, the error is generated in the command value V* of the sine-wave target voltage as described above, and the voltage deviated by the error is produced to generate the spike noise at a moment when the switch element is turned on and off.

Therefore, in one or more embodiments, the gains of the measuring circuits are automatically calibrated such that the measured values of the measuring circuits are matched with one another with respect to the identical measuring voltage.

In one or more embodiments, the gains of the measuring circuits corresponding to the voltages Vd2 and Vd3 are calibrated based on the measuring circuit corresponding to the voltage Vd1.

Figure 16:
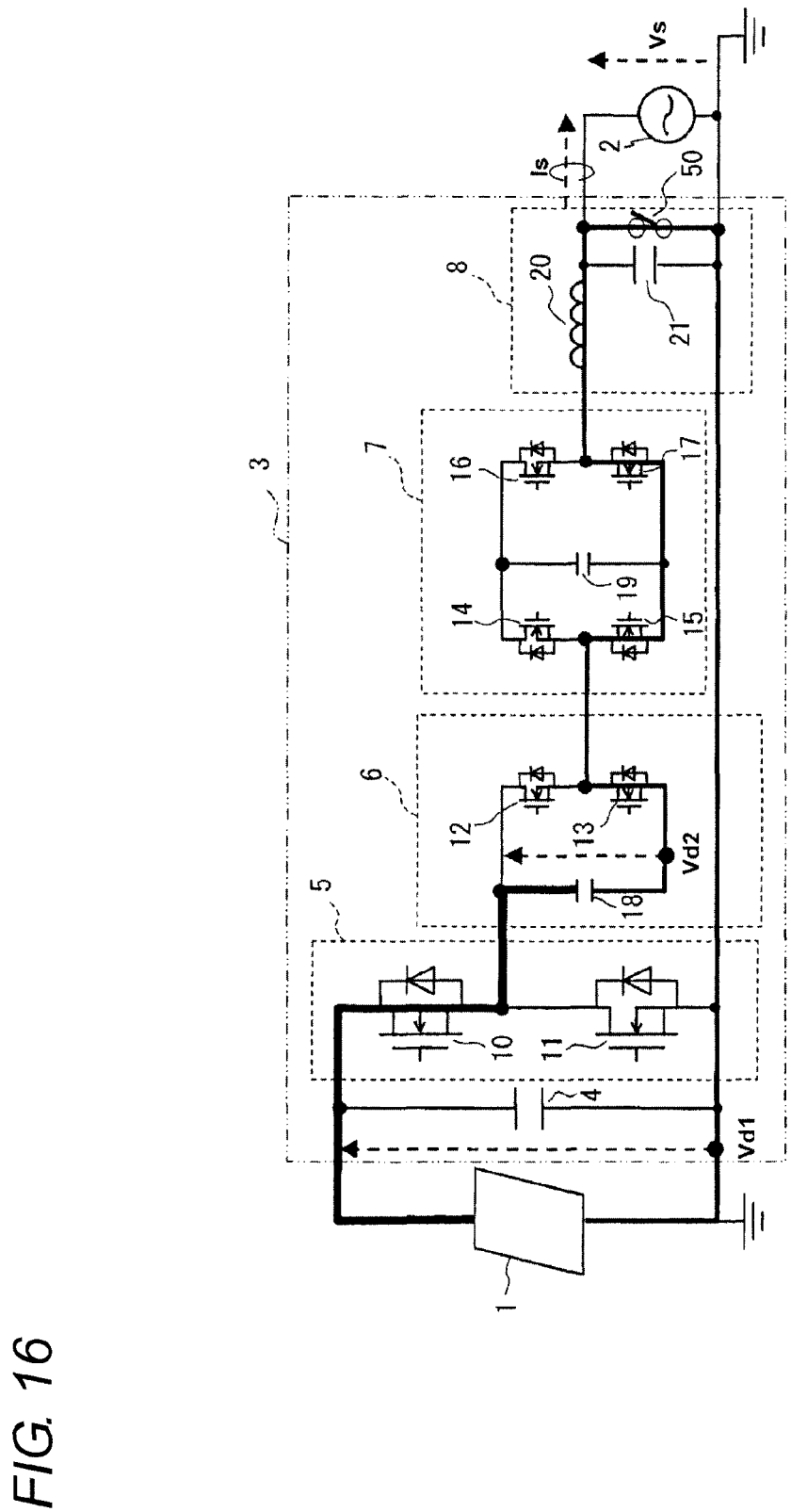
FIG. 16, corresponding to FIG. 1, is a view of a circuit diagram explaining a procedure of a gain calibration of one or more embodiments.

FIG. 16 is a configuration diagram illustrating the case in which the measuring circuit corresponding to the voltage Vd2 is calibrated based on the measuring circuit corresponding to the voltage Vd1. In FIG. 16, the portion corresponding to that of FIG. 1 is designated by the identical reference numeral.

In one or more embodiments, before the running is started, an output short-circuit relay 50 is closed while an interconnecting relay (not illustrated) is opened to separate the photovoltaic power system from the system of the commerial power source, and the ON/OFF control is performed to the switch elements 10 to 17 such that the voltage Vd1 at both ends of the first capacitor 4 and the voltage Vd2 at both ends of the second capacitor 18 become identical.

Specifically, the first switch element 10, the fourth switch element 13, the sixth switch element 15, and the eighth switch element 17 are turned on while the second switch element 11, the third switch element 12, the fifth switch element 14, and the seventh switch element 16 are turned off, and the switching is controlled such that the voltage Vd1 at both ends of the first capacitor 4 and the voltage Vd2 at both ends of the second capacitor 18 become identical.

Therefore, a correction factor is computed by the following equation in order to perform the correction such that the measured value of the measuring circuit corresponding to the voltage Vd2 is matched with the measured value of the measuring circuit corresponding to the voltage Vd1.

correction factor=(measured value of voltage Vd1)/(measured value of voltage Vd2)

In the normal running after the correction factor is obtained, the post-correction measured value in which the measured value of the voltage Vd2 is corrected can be obtained by multiplying the correction factor by the measured value (pre-correction measured value) of the voltage Vd2 measured by the measuring circuit.

That is, the post-correction measured value of the voltage Vd2 is computed by the following equation.

post-correction measured value of voltage Vd2=correction factor x pre-correction measured value of voltage Vd2

Therefore, the measured value of the measuring circuit corresponding to the voltage Vd1 and the measured value of the measuring circuit corresponding to the voltage Vd2 can be matched with each other with respect to the identical voltage.

Figure 17:
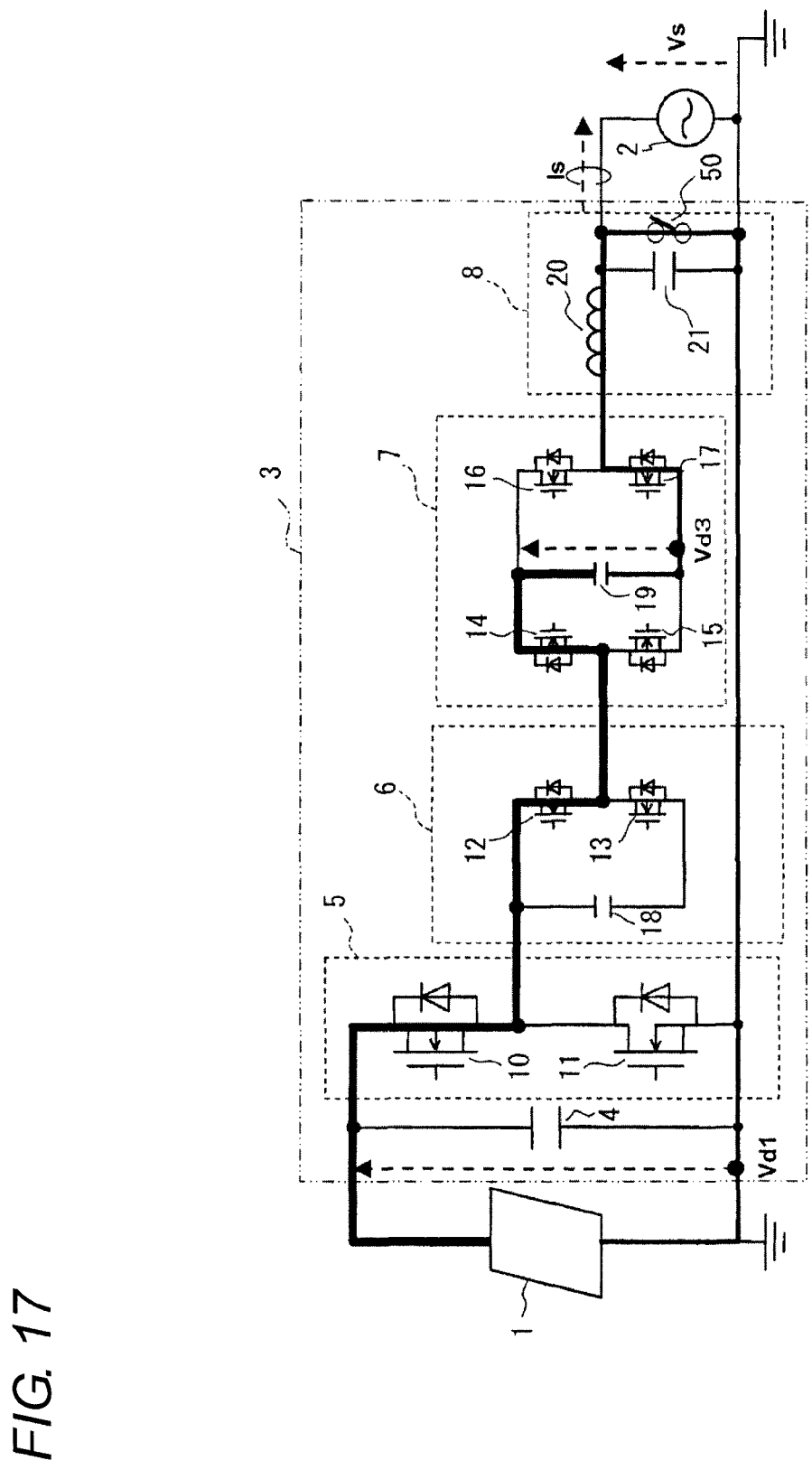
FIG. 17 corresponding to FIG. 1, is a view of a circuit diagram explaining a procedure of the gain calibration of one or more embodiments.

FIG. 17 is a configuration diagram illustrating the case in which the measuring circuit corresponding to the voltage Vd3 is calibrated based on the measuring circuit corresponding to the voltage Vd1. In FIG. 17, the portion corresponding to that of FIG. 1 is designated by the identical reference numeral.

Similarly to the case in which the measuring circuit corresponding to the voltage Vd2 is calibrated, the output short-circuit relay 50 is closed while the interconnecting relay is opened to separate the photovoltaic power system from the system of the commercial power source, and the ON/OFF control is performed to the switch elements 10 to 17 such that the voltage Vd1 at both ends of the first capacitor 4 and the voltage Vd3 at both ends of the third capacitor 19 become identical.

Specifically, the first switch element 10, the third switch element 12, the fifth switch element 14, and the eighth switch element 17 are turned on while the second switch element 11, the fourth switch element 13, the sixth switch element 15, and the seventh switch element 16 are turned off, and the switching is controlled such that the voltage Vd1 at both ends of the first capacitor 4 and the voltage Vd3 at both ends of the third capacitor 19 become identical.

Therefore, a correction factor is computed by the following equation in order to perform the correction such that the measured value of the measuring circuit corresponding to the voltage Vd3 is matched with the measured value of the measuring circuit corresponding to the voltage Vd1.

correction factor=measured value of voltage Vd1/measured value of voltage Vd3

In the normal running after the correction factor is obtained, the post-correction measured value in which the measured value of the voltage Vd3 is corrected can be obtained by multiplying the correction factor by the measured value (pre-correction measured value) of the voltage Vd3 measured by the measuring circuit.

That is, the post-correction measured value of the voltage Vd3 is computed by the following equation.

post-correction measured value of voltage Vd3=correction factor×pre-correction measured value of voltage Vd3

Therefore, the measured value of the measuring circuit corresponding to the voltage Vd1 and the measured value of the measuring circuit corresponding to the voltage Vd3 can be matched with each other with respect to the identical voltage.

As described above, the measured values of the measuring circuits corresponding to the voltages Vd1, Vd2, and Vd3 can be matched with one another with respect to the identical voltage, so that the AC-voltage spike noise caused by the error of the measured value can be suppressed.

One or more embodiments of the invention are useful to the power converter. While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A power converter comprising:
   first means for chopping a DC voltage at a first frequency to produce a first square-wave voltage string comprising a plurality of square-wave voltages,
      wherein a voltage level of the square-wave voltage changes onto a positive side with respect to a first reference potential,
   the first means comprising a first switch circuit in which first and second switch elements are connected in series,
      wherein the first switch circuit is connected in parallel to a first capacitor connected between positive and negative electrodes of a DC power source;
   second means for chopping an output of the first means at a second frequency higher than the first frequency to produce a second square-wave voltage string comprising a plurality of square-wave voltages,
      wherein a voltage level of the square-wave voltage is lower than that of the first square-wave voltage string on the positive side and changing onto a negative side with respect to a second reference potential,
      wherein a potential at the first square-wave voltage string is set to the second reference potential,
      wherein the second means produces a third square-wave voltage string by adding the first square-wave voltage string and the second square-wave voltage string,
      wherein the first square-wave voltage string and the second square-wave voltage string alternately change in a sine-wave manner on positive and negative sides with respect to the first reference potential in the third square-wave voltage string,
   the second means comprising a second means parallel-connected circuit in which a second capacitor and a second switch circuit are connected in parallel,
      wherein one side of the second means parallel-connected circuit is connected to a series-connected portion of the first and second switch elements,
      wherein the second switch circuit comprises third and fourth switch elements connected in series;
   third means for chopping the third square-wave voltage string at a third frequency to perform charge and discharge,
      wherein the third frequency is fixed by timing according to a positive or a negative of a difference between the third square-wave voltage string and a sine-wave voltage,
   the third means comprising a third means parallel-connected circuit in which a third capacitor and a third switch circuit are connected in parallel,
      wherein the third switch circuit comprises fifth and sixth switch elements connected in series,
      wherein a series-connected portion of the fifth and sixth switch elements is connected to a series-connected portion of the third and fourth switch elements;
   fourth means for performing PWM control to outputs of the charge and discharge of the third square-wave voltage string means at a PWM frequency higher than the third frequency so as to correct the difference between the third square-wave voltage string and the sine-wave voltage,
      wherein the fourth means obtains a sine-wave voltage that continuously changes on the positive and negative sides with respect to the first reference potential by the third square-wave voltage string and the PWM output,
   the fourth means comprising a fourth switch circuit that is connected in parallel to the third means parallel-connected circuit,
      wherein the fourth switch circuit includes seventh and eighth switch elements connected in series;
   a plurality of measuring circuits each of which measures a voltage between both ends of each of the first capacitor, the second capacitor, and the third capacitor;
   control means for controlling each of the first to eighth switch elements based on a measured value of each measuring circuit; and
   gain calibration means for calibrating a gain of each measuring circuit.

2. The power converter according to claim 1,
   wherein the control means controls the first to eighth switch elements while short-circuiting an output of the fourth means such that an identical voltage is applied to both ends of two capacitors in the first capacitor, the second capacitor, and the third capacitor, and
   wherein the gain calibration means calibrates the gain based on the measured values of the measuring circuits corresponding to the two capacitors to which the identical voltage is applied.

3. The power converter according to claim 2,
wherein the control means sets one of the first capacitor, the second capacitor, and the third capacitor to a reference and performs control,
wherein an identical voltage is applied to both ends of each two capacitors including the reference capacitor, and
wherein the gain calibration means calibrates the gains of the two measuring circuits except the reference capacitor based on the measured value of the measuring circuit corresponding to the reference capacitor to which the identical voltage is applied.

4. A power conditioner that converts a DC power from a DC power source into an AC power interconnected to a system of a commercial power source, the power conditioner comprising:
first means for chopping a DC voltage at a first frequency that is a system frequency to produce a first square-wave voltage string comprising a plurality of square-wave voltages,
wherein a voltage level of the square-wave voltage changes onto a positive side with respect to a first reference potential,
the first means comprising a first switch circuit in which first and second switch elements are connected in series,
wherein the first switch circuit is connected in parallel to a first capacitor connected between positive and negative electrodes of a DC power source;
second means for chopping an output of the first means at a second frequency higher than the first frequency by a predetermined number of times to produce a second square-wave voltage string comprising a plurality of square-wave voltages,
wherein a voltage level of the square-wave voltage is lower than that of the first square-wave voltage string on the positive side and changing onto a negative side with respect to a second reference potential,
wherein a potential at the first square-wave voltage string is set to the second reference potential,
wherein the second means produces a third square-wave voltage string by adding the first square-wave voltage string and the second square-wave voltage string,
wherein the first square-wave voltage string and the second square-wave voltage string alternately change in a sine-wave manner on positive and negative sides with respect to the first reference potential in the third square-wave voltage string,
the second means comprising a second means parallel-connected circuit in which a second capacitor and a second switch circuit are connected in parallel,
wherein one side of the second means parallel-connected circuit is connected to a series-connected portion of the first and second switch elements,
wherein the second switch circuit comprises third and fourth switch elements connected in series;
third means for chopping the third square-wave voltage string at a third frequency to perform charge and discharge,
wherein the third frequency is fixed by timing according to a positive or a negative of a difference between the third square-wave voltage string and a sine-wave voltage,
the third means comprises a third means parallel-connected circuit in which a third capacitor and a third switch circuit are connected in parallel,
wherein the third switch circuit comprises fifth and sixth switch elements connected in series,
wherein a series-connected portion of the fifth and sixth switch elements is connected to a series-connected portion of the third and fourth switch elements;
fourth means for performing PWM control to outputs of the charge and discharge of the third square-wave voltage string means at a PWM frequency higher than the third frequency so as to correct the difference between the third square-wave voltage string and the sine-wave voltage,
wherein the fourth means obtains a sine-wave voltage that continuously changes on the positive and negative sides with respect to the first reference potential by the third square-wave voltage string and the PWM output,
the fourth means comprising a fourth switch circuit that is connected in parallel to the third means parallel-connected circuit,
wherein the fourth switch circuit comprises seventh and eighth switch elements connected in series;
a plurality of measuring circuits each of which measures a voltage between both ends of each of the first capacitor, the second capacitor, and the third capacitor;
control means for controlling each of the first to eighth switch elements based on a measured value of each measuring circuit; and
gain calibration means for calibrating a gain of each measuring circuit.

5. A power converter comprising:
a first switch circuit comprising first and second switch elements connected in series,
wherein the first switch circuit is connected in parallel to a first capacitor connected between positive and negative electrodes of a DC power source,
wherein the first switch circuit chops a DC voltage at a first frequency to produce a first square-wave voltage string comprising a plurality of square-wave voltages,
wherein a voltage level of the square-wave voltage changes onto a positive side with respect to a first reference potential;
a first parallel-connected circuit comprising a second capacitor and a second switch circuit connected in parallel,
wherein one side of the first parallel-connected circuit is connected to a series-connected portion of the first and second switch elements, wherein the second switch circuit comprises third and fourth switch elements connected in series,
wherein the first parallel-connected circuit chops an output of the first switch circuit at a second frequency higher than the first frequency to produce a second square-wave voltage string comprising a plurality of square-wave voltages,
wherein a voltage level of the square-wave voltage is lower than that of the first square-wave voltage string on the positive side and changing onto a negative side with respect to a second reference potential,
wherein a potential at the first square-wave voltage string is set to the second reference potential,
wherein the first parallel-connected circuit produces a third square-wave voltage string by adding the first square-wave voltage string and the second square-wave voltage string,
wherein the first square-wave voltage string and the second square-wave voltage string alternately change in a sine-wave manner on positive and negative sides with respect to the first reference potential in the third square-wave voltage string;

a second parallel-connected circuit in which a third capacitor and a third switch circuit are connected in parallel,
  wherein the third switch circuit comprises fifth and sixth switch elements connected in series, wherein a series-connected portion of the fifth and sixth switch elements is connected to a series-connected portion of the third and fourth switch elements,
  wherein the second parallel-connected circuit chops the third square-wave voltage string at a third frequency to perform charge and discharge,
  wherein the third frequency is fixed by timing according to a positive or a negative of a difference between the third square-wave voltage string and a sine-wave voltage;
a fourth switch circuit that is connected in parallel to the second parallel-connected circuit, the fourth switch circuit including seventh and eighth switch elements connected in series,
  wherein the fourth switch circuit performs PWM control to outputs of the charge and discharge of the third square-wave voltage string at a PWM frequency higher than the third frequency so as to correct the difference between the third square-wave voltage string and the sine-wave voltage,
  wherein the fourth switch circuit obtains a sine-wave voltage that continuously changes on the positive and negative sides with respect to the first reference potential by the third square-wave voltage string and the PWM output;

a plurality of measuring circuits each of which measures a voltage between both ends of each of the first capacitor, the second capacitor, and the third capacitor;
a control circuit for controlling each of the first to eighth switch elements based on a measured value of each measuring circuit; and
a gain calibration circuit for calibrating a gain of each measuring circuit.

6. The power converter according to claim 1,
wherein the control circuit controls the first to eighth switch elements while short-circuiting an output of the fourth switch circuit such that an identical voltage is applied to both ends of two capacitors in the first capacitor, the second capacitor, and the third capacitor, and
wherein the gain calibration circuit calibrates the gain based on the measured values of the measuring circuits corresponding to the two capacitors to which the identical voltage is applied.

7. The power converter according to claim 2,
wherein the control circuit sets one of the first capacitor, the second capacitor, and the third capacitor to a reference and performs control,
wherein an identical voltage is applied to both ends of each two capacitors including the reference capacitor, and
wherein the gain calibration circuit calibrates the gains of the two measuring circuits except the reference capacitor based on the measured value of the measuring circuit corresponding to the reference capacitor to which the identical voltage is applied.

* * * * *